US008574649B2

(12) United States Patent
Lin

(10) Patent No.: US 8,574,649 B2
(45) Date of Patent: Nov. 5, 2013

(54) STOVE AND METHOD FOR PREVENTING COOKED MATERIAL FROM BEING BURNT DRY

(76) Inventor: Yu-Chien Lin, Taipei (TW)

( * ) Notice: Subject to any disclaimer, the term of this patent is extended or adjusted under 35 U.S.C. 154(b) by 178 days.

(21) Appl. No.: 13/242,901

(22) Filed: Sep. 23, 2011

(65) Prior Publication Data

US 2012/0082765 A1 Apr. 5, 2012

(30) Foreign Application Priority Data

Oct. 1, 2010 (TW) ............................... 99133480 A

(51) Int. Cl.
*A23L 1/01* (2006.01)

(52) U.S. Cl.
USPC ........... 426/231; 426/233; 426/523; 219/708; 219/518; 99/332; 99/337

(58) Field of Classification Search
USPC .................. 426/231–233, 523; 219/708, 518; 99/331–333, 337–338
See application file for complete search history.

(56) References Cited

U.S. PATENT DOCUMENTS 4,590,350 A * 5/1986 Ueda ............................ 219/705
4,784,052 A * 11/1988 Harada et al. ................... 99/331
5,310,110 A * 5/1994 Akamatsu et al. .......... 236/20 A
5,345,067 A * 9/1994 Ohta et al. .................... 219/720
5,831,253 A * 11/1998 Han et al. ...................... 219/708
5,859,413 A * 1/1999 Kim et al. ..................... 219/708
6,118,105 A * 9/2000 Berkcan et al. ............... 219/497
6,239,414 B1 * 5/2001 Newcomer ................. 219/447.1
6,253,761 B1 * 7/2001 Shuler et al. ..................... 126/42
6,867,403 B2 * 3/2005 Shon et al. .................... 219/707
2002/0113062 A1 * 8/2002 Cranford ....................... 219/518
2012/0321760 A1 * 12/2012 Xie .............................. 426/231

* cited by examiner

*Primary Examiner* — Drew E Becker
(74) *Attorney, Agent, or Firm* — WAPT, PC; Justin King

(57) ABSTRACT

A stove and a method for preventing a cooked material from being burnt dry are provided. The stove includes a stove body for heating the cooked material, a weighing unit for generating a weighing signal of the cooked material, a monitoring unit for judging whether the user is managing the cooked material, and a computing unit. The weighing signal is changed with time. A plurality of weighing signal change amounts respectively generated within a plurality of time intervals are calculate by the computing unit. According to the weighing signal change amounts, the heat source of the stove body is adjusted. Consequently, the function of preventing the cooked material from being burnt dry will be achieved.

14 Claims, 14 Drawing Sheets

STOVE AND METHOD FOR PREVENTING COOKED MATERIAL FROM BEING BURNT DRY

FIELD OF THE INVENTION

The present invention relates to a stove and a method for preventing a cooked material from being burnt dry.

BACKGROUND OF THE INVENTION

Nowadays, a variety of heating devices such as gas stoves, electric stoves, electromagnetic oven or microwave ovens are widely used to cook food. During the process of stewing soup, boiling water or performing other time-consuming cuisine steps, it is necessary to pay attention to the cooking time. If the user deals with other matters or temporarily leaves the kitchen during the waiting time, some problems may occur. For example, in a case that the cooking time is misjudged or the user forgets the food is still being cooked, the food or the broth or the water is possibly burnt dry or over-burnt. Under this circumstance, the food and the energy sourceare wasted, and the over-burning condition is at high risk of a fire accident therefore, the family kitchen with a fire accident has become the greatest threat to the safety of family property.

On basis of safety considerations, a so-called anti-dry stove has been introduced into the market. For preventing the food or the broth or the water from being burnt dry during the cooking process and minimizing the risk of the fire accident, the anti-dry stove is usually equipped with a temperature detector or an overheating protection device for detecting the temperature at the bottom of the foodstuff container. Generally, once the safety mechanism of the temperature detector or the overheating protection device is enabled, it is found that the foodstuff container is usually charred and the temperature of the foodstuff container increases to an abnormal high temperature. In other words, the problem of burning dry or over-burning the food or the broth or the water fails to be timely and effectively avoided, because the foodstuff container and the food inside the foodstuff container are already in the burnt dry condition, and the problem of wasting the food and energy source and the risk of fire accident still exists.

For example, a weighable intelligent stove is disclosed in Chinese Utility Model Patent No. 03224145b. A weighing device is installed on a stove body of the intelligent stove. Since the weight of the cooked material on the stove gradually decreases during the cooking process, the required weight of the thoroughly-cooked food may be previously set. When the weight of the cooked food reaches the preset value, the switch of the stove is electronically or mechanically controlled.

However, during the process of cooking food, the firepower level of the heat source or the amount of food ingredients should be frequently adjusted according to the feature and amount of the food ingredient, the practical requirements or the cooking method. Moreover, the various cooking methods include frying, boiling, stir-frying, deep-frying, stewing, and many other different cooking methods. For different cooking methods, the firepower level and the cooking time are completely distinguished. Even if the food ingredients are identical, the weight changes of the food cooked by different cooking methods are also distinguished. Moreover, if stove is operated or the food ingredients are stirred or increased or decreased during the cooking process, the weight change of the cooked material is sensed. That is, since only the food weight is used to determine the firepower level and the cooking time or the weight of the thoroughly cooked material is estimated and set, the conventional cooking methods fail to meet the practical requirements.

Therefore, the present invention provides an improved cooking method for preventing a cooked material from being burnt dry by monitoring "the weight drop rate or the slope of weight change" of the cooked material. The term "weight drop rate or slope of weight change" indicates the difference between the weight of the cooked material before reaching the boiling point and the weight of the cooked material after reaching the boiling point. On basis of safety and energy-saving considerations, the method and the stove of the present invention are advantageous over the conventional anti-dry stove and the conventional weight-setting method.

SUMMARY OF THE INVENTION

The present invention provides a stove and a method for preventing a cooked material from being burnt dry by monitoring a plurality of weighing signal change amounts that are respectively generated within a plurality of time intervals.

The present invention also provides a stove and a method for preventing a cooked material from being burnt dry by monitoring whether said cooked material is being managed by the user.

In accordance with an aspect of the present invention, there is provided a stove for preventing a cooked material from being burnt dry. The stove includes a stove body, a weighing unit, a monitoring unit, a computing unit and a heat source controlling unit. The stove body is used for generating a heat source to heat the cooked material. The weighing unit is used for sensing a weight of the cooked material, thereby generating a weighing signal correspondingly. The monitoring unit is in communication with the weighing unit for receiving the weighing signal and monitoring whether the cooked material is being managed by a user according to the weighing signal. The computing unit is in communication with the monitoring unit. The weighing signal is changed with time, and a plurality of weighing signal change amounts respectively generated within a plurality of time intervals are calculated by the computing unit. According to the weighing signal change amounts, a heat source adjusting signal is generated by the computing unit. The heat source controlling unit is in communication with the computing unit for receiving the heat source adjusting signal and controlling a firepower level of the heat source according to the heat source adjusting signal, thereby preventing the cooked material from being burnt dry.

In accordance with an aspect of the present invention, there is provided a method for preventing a cooked material from being burnt dry in a stove. The method includes the following steps. In a step (A), the stove is activated to generate a heat source to heat the cooked material. In a step (B), a weight of the cooked material is sensed, thereby generating a weighing signal correspondingly. Then, a step (C) is performed to judge whether the cooked material is being managed by a user. If the cooked material is being managed by the user, the step (B) is performed. Whereas, if the cooked material is not being managed by the user, the step (D) is performed. In the step (D), generating a heat source adjusting signal for adjusting the heat source, thereby preventing the cooked material from being burnt dry. Moreover, in the step (D), a plurality of weighing signal change amounts are respectively generated within a plurality of time intervals, and the heat source adjusting signal is generated according to the weighing signal change amounts.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
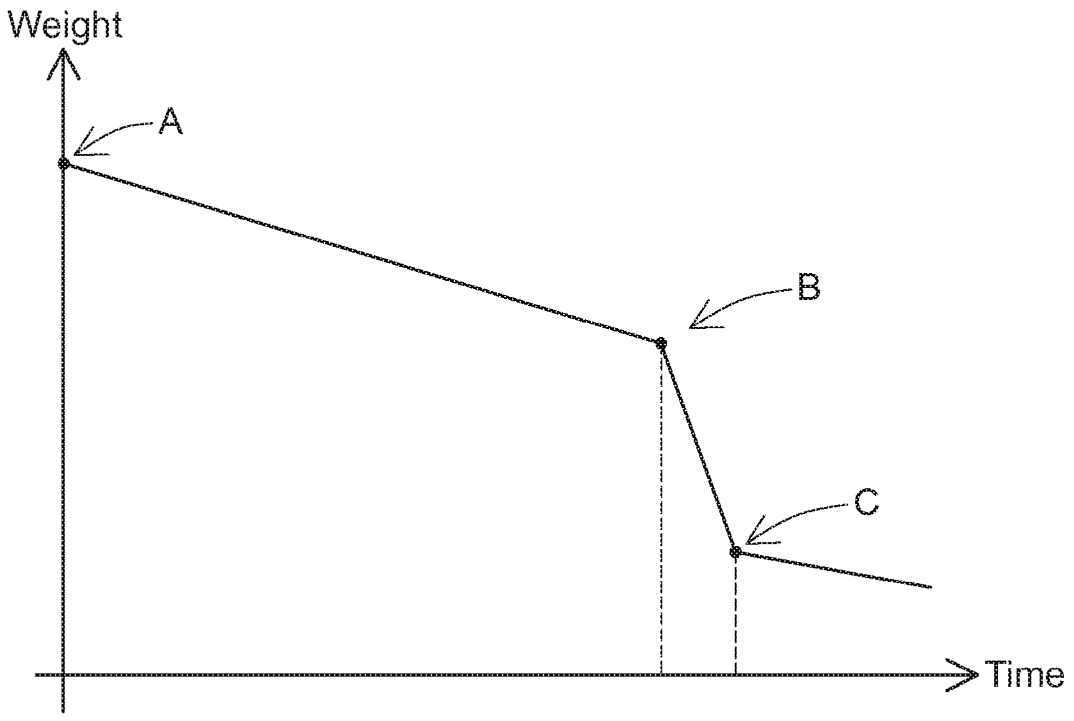
FIG. 1 is a schematic timing diagram illustrating a typical weight drop curve of a cooked material during a cooking process.

FIG. 1 is a schematic timing diagram illustrating a typical weight drop curve of a cooked material during a cooking process. At the point A, the stove is activated to start cooking the cooked material. Since the cooked material is heated by a heat source of the stove during the cooking process, the moisture contained in the cooked material is continuously evaporated. That is, the weight of the cooked material is continuously decreased. At the point B when the cooked material is heated to the boiling point of the broth or water, which is for example 100 degrees Celsius but may alter as the air pressure varies, the evaporation speed of the broth or water is abruptly increased. Under this circumstance, the weight of the cooked material is quickly decreased. In other words, the weight of the cooked material before the boiling point and the weight of the cooked material after the boiling point are obviously distinguished. At the point C when the moisture contained in the cooked material is burnt dry, the cooked material starts to be charred. Under this circumstance, the weight of cooked material is slowly changed. The present invention provides a stove and a method for preventing the cooked material from being burnt dry by referring to the condition that the weight of the cooked material is quickly decreased after the cooked material is heated to the boiling point of the broth or water.

Figure 2:
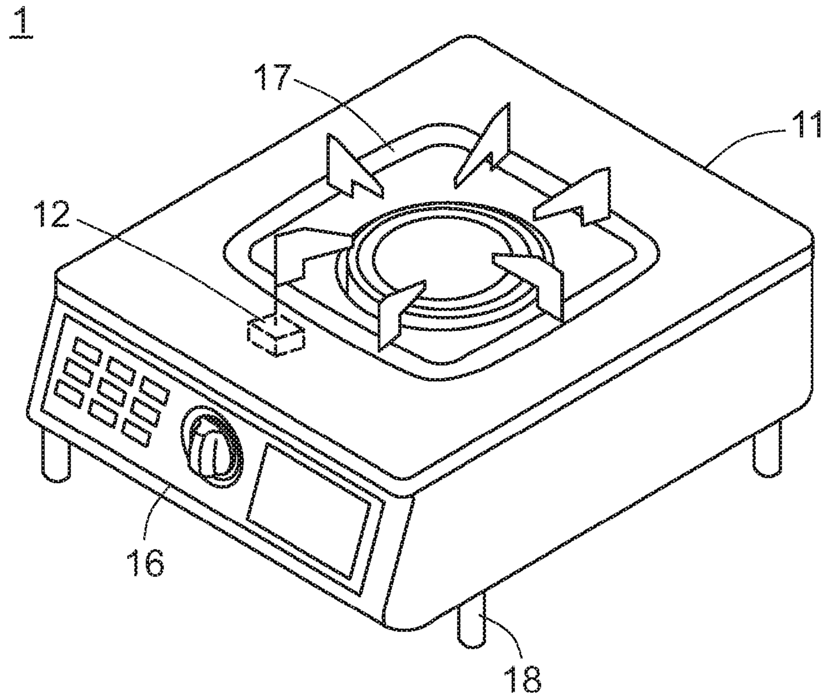
FIG. 2 is a schematic view illustrating the outward appearance of a stove according to an embodiment of the present invention.
Figure 3:
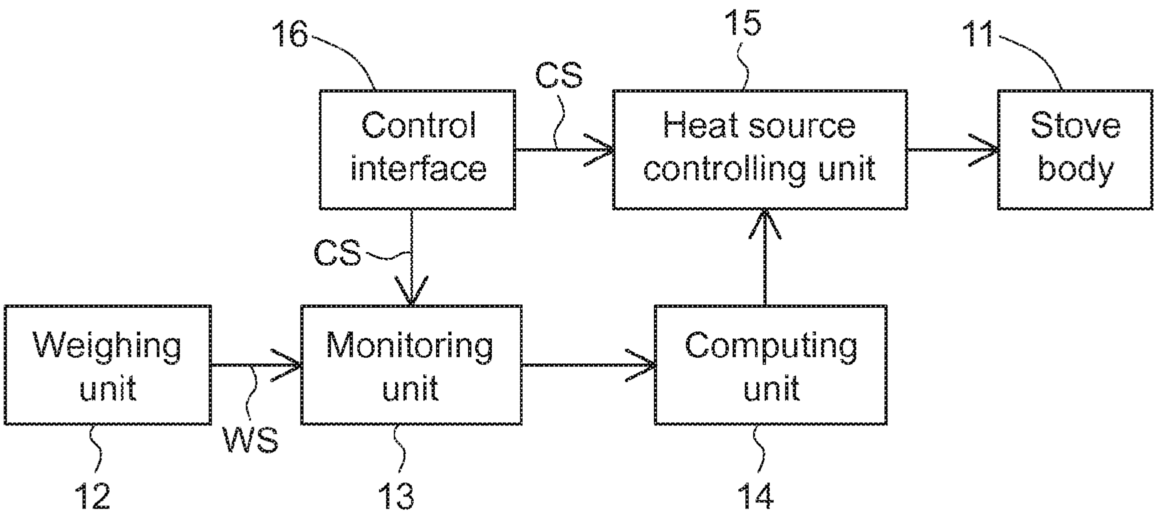
FIG. 3 is a schematic functional block diagram illustrating the stove according to the embodiment of the present invention.

FIG. 2 is a schematic view illustrating the outward appearance of a stove according to an embodiment of the present invention. FIG. 3 is a schematic functional block diagram illustrating the stove according to the embodiment of the present invention. The stove 1 of the present invention is capable of preventing the cooked material being burnt dry or over-burnt. As shown in FIGS. 2 and 3, the stove 1 comprises a stove body 11, a weighing unit 12, a control interface 16, a monitoring unit 13, a computing unit 14, and a heat source controlling unit 15. The monitoring unit 13, the computing unit 14 and the heat source controlling unit 15 are disposed within the stove body 11.

The operations of the stove 1 will be illustrated in more details as follows. Firstly, the user may turn on the stove 1 via the control interface 16. By adjusting the control interface 16, a control signal CS is transmitted to the heat source controlling unit 15. According to the control signal CS, the stove body 11 generates a heat source for heating a cooked material. Moreover, the user may set the time duration of cooking the cooked material via the control interface 16. Moreover, the stove 1 further includes a supporting rack 17 and a bottom holder 18. The supporting rack 17 is used for supporting the cooked material. Through the bottom holder 18, a gap is formed between the bottom of the stove body 11 and the placement surface of the stove body 11. Due to the gap, the heat-dissipating efficacy of the stove body 11 is enhanced. The weighing unit 12 is located at the supporting rack 17 or the bottom holder 18. By sensing the weight of the cooked material, the weighing unit 12 generates a weighing signal WS corresponding to the cooked material.

Figure 4A:
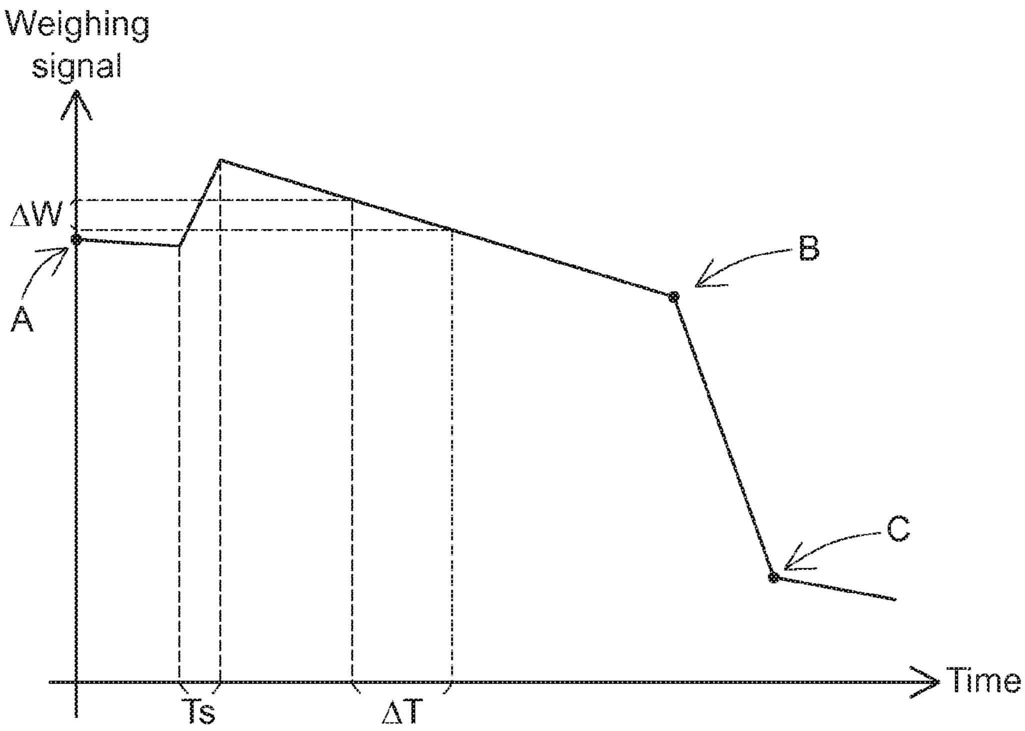
FIGS. 4A and 4B are schematic timing diagrams illustrating a weight drop curve of a cooked material during a cooking process, in which the cooked material is managed by the user during the cooking process.
Figure 4B:
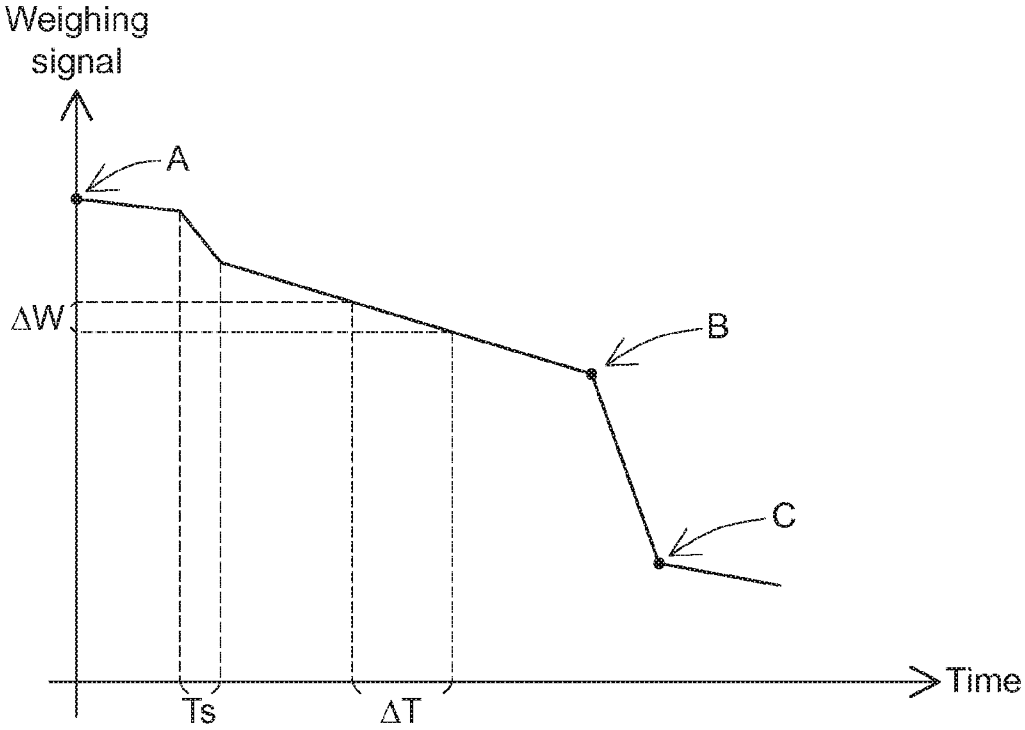

FIGS. 4A and 4B are schematic timing diagrams illustrating a weight drop curve of a cooked material during a cooking process, in which the cooked material is managed by the user during the cooking process. In a case that the user is located beside the stove body 11 to manage the cooked material, it means that the cooking status of the cooked material is being controlled by the user. Under this circumstance, it is not necessary to enable the anti-dry safety mechanism of the present invention, so that the management of the cooked material by the user is not affected. The monitoring unit 13 is used for monitoring whether the user is managing the cooked material. The monitoring unit 13 is in communication with the weighing unit 12 and the control interface 16. In a case that the user operates the control interface 16 to adjust the firepower level of the heat source, a control signal CS outputted from the control interface 16 is received by the monitoring unit 13. According to the control signal CS, the monitoring unit 13 may judge that the user is managing the cooked material. Meanwhile, the anti-dry safety mechanism is not enabled. Moreover, the weighing signal WS outputted from the weighing unit 12 is also received by the monitoring unit 13. If the amount of the cooked material is simply increased or decreased or the cooked material is stirred, the monitoring unit 13 may judge that the user is managing the cooked material. Meanwhile, the anti-dry safety mechanism is not enabled. For example, if the soup ingredient is added to the cooked material or the thoroughly-cooked material is removed, the weight of the cooked material is suddenly increased or decreased by 20% in a few minute. In addition, if the cooked material is turned over or stirred, the weighing signal WS will be abruptly varied, increased or decreased in a very short monitoring time interval Ts. As shown in FIGS. 4A and 4B, the weighing signal of the cooked material is abruptly varied in the monitoring time interval Ts. Under this circumstance, the monitoring unit 13 may judge that the user is managing the cooked material, and thus the anti-dry safety mechanism is not enabled.

On the other hand, if the monitoring unit 13 judges that a change of the weighing signal is continuously and stably decreased to a preset slope $\Delta W/\Delta T$, the user may forget the cooked material is being cooked. Under this circumstance, the anti-dry safety mechanism should be enabled. The duration of the monitoring time interval Ts is determined according to the settings of the monitoring unit 13. For example, if the weight of the cooked material is increased or decreased by 10% within one minute, the monitoring unit 13 may judge that the user is managing the cooked material.

In an embodiment, the anti-dry safety mechanism includes an approach of adjusting the heat source generated by the stove body 11 (e.g. reducing the firepower level of the heat source) or directly turning off the heat source of the stove. The timing of adjusting the firepower level of the heat source of the stove body 11 or directly turning off the heat source of the stove is determined according to the settings of the computing unit 14.

Figure 5:
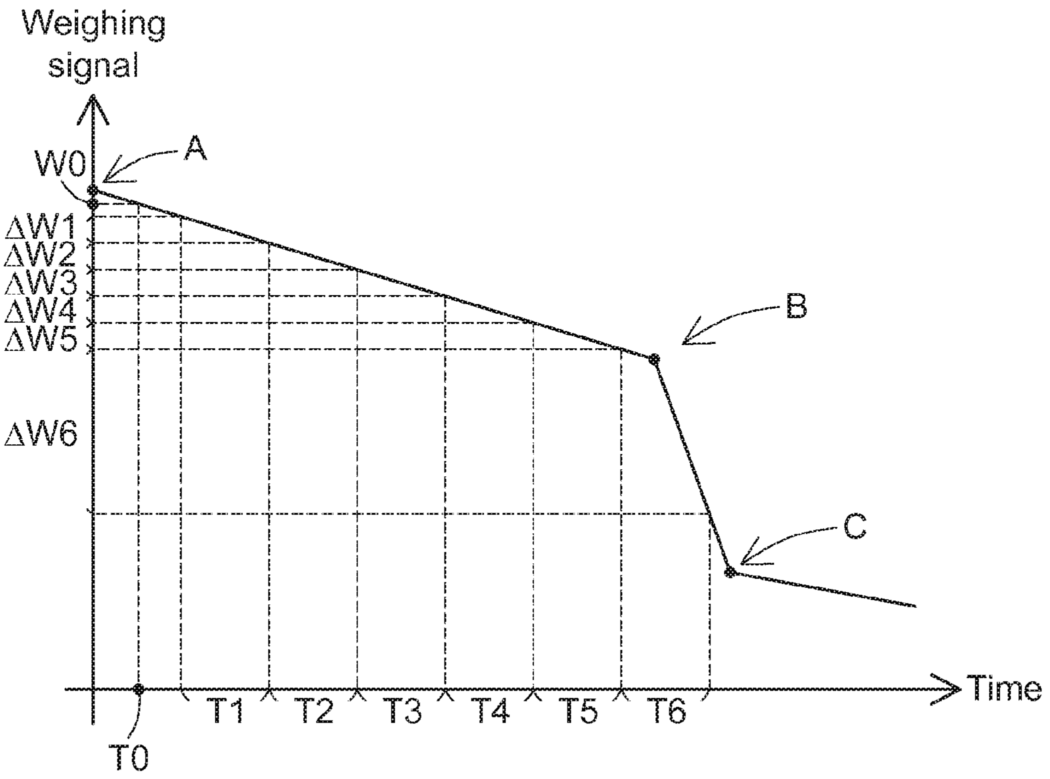
FIG. 5 schematically illustrates an approach of calculating a weight change ratio or slope of the cooked material by the computing unit according to a first embodiment of the present invention.

FIG. 5 schematically illustrates an approach of calculating a weight change ratio or slope of the cooked material by the computing unit according to a first embodiment of the present invention. Please refer to FIGS. 3 and 5. The computing unit 14 is in communication with the monitoring unit 13 for receiving the weighing signal WS from the monitoring unit 13. The weighing signal WS changes with the cooking time. At the time spot T0, when the monitoring unit 13 judges that the cooked material is not managed by the user, the cooked material has an initial weighing signal W0.

As previously described, the weight of the cooked material will be quickly decreased when the cooked material is heated to the boiling point of the liquid contained in the cooked material. Then, a plurality of weighing signal change amounts (ΔW1, ΔW2, ΔW3, ΔW4, ΔW5, ΔW6) of the cooked material within a plurality of consecutive time intervals (T1, T2, T3, T4, T5, T6) are successively calculated by the computing unit 14. Then, one of these weighing signal change amounts (e.g. ΔW2) is selected as a basis weighing signal change amount. The basis weighing signal change amount is determined according to the settings of the computing unit 14. Since the weighing signal change amount is usually small in the early heating stage, the weighing signal change amount obtained in the middle heating stage may be used as the basis weighing signal change amount. After the weighing signal change amount ΔW2 is selected as the basis weighing signal change amount, the ratios of the weighing signal change amounts ΔW3, ΔW4, ΔW5, ΔW6 to the basis weighing signal change amount ΔW2 (i.e. ΔW3/ΔW2, ΔW4/ΔW2, ΔW5/ΔW2 and ΔW6/ΔW2) are successively calculated. Once the ratio is higher than a preset value (for example the ratio ΔW6/ΔW2 is higher than the preset value), it means that the weight of the cooked material is quickly decreased at a specified rate. In practice, the temperature of the cooked material reaches the boiling point of the liquid contained in the cooked material at this moment. Meanwhile, if the cooked material is continuously heated, the cooked material is possibly burnt dry. For preventing the cooked material from being burnt dry, the computing unit 14 issues a heat source adjusting signal to the heat source controlling unit 15. According to the heat source adjusting signal, the heat source controlling unit 15 will adjust the firepower level of the heat source of the stove body 11 in order to prevent the cooked material from being burnt dry.

During the plural weighing signal change amounts of the cooked material within the plural time intervals are calculated by the computing unit 14, if the monitoring unit 13 judges that the user is located beside the stove to manage the cooked material, the above data should be re-acquired. That is, if the weight of the cooked material is abruptly increased or decreased within the monitoring time interval or the control signal CS is detected, a new initial weighing signal W0 should be acquired until the monitoring unit 13 judges that the cooked material is not being managed by the user. Then, a plurality of weighing signal change amounts of the cooked material within a plurality of subsequent time intervals are successively calculated to determine the timing of adjusting the heat source, thereby preventing the cooked material from being burnt dry.

Figure 6:
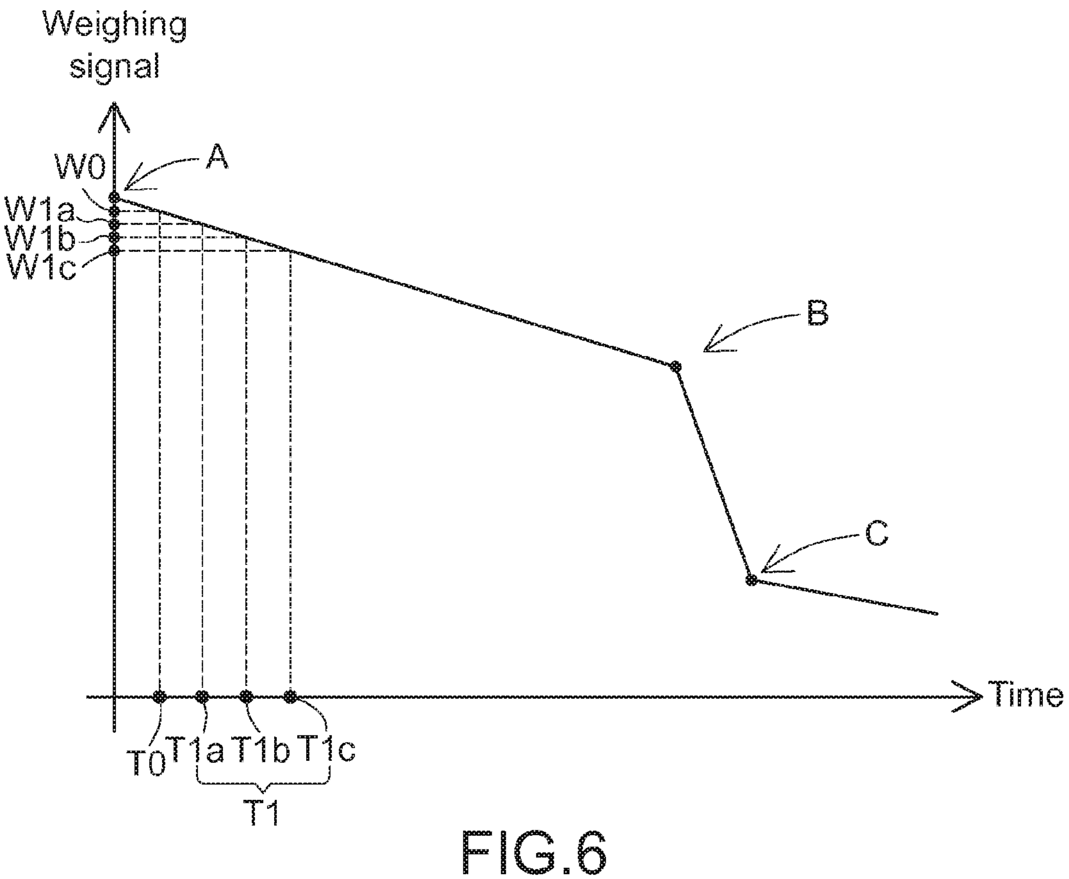
FIG. 6 schematically illustrates an approach of calculating a weighing signal change amount of the cooked material by the computing unit according to an embodiment of the present invention.

FIG. 6 schematically illustrates an approach of calculating a weighing signal change amount of the cooked material by the computing unit according to an embodiment of the present invention. The weighing signal change amount denotes a difference between two weighing signals generated at two time spots of the time interval. For example, the weighing signal change amount ΔW1 is the difference (W1*a*−W1*c*) between the two weighing signals generated at two time spots T1*a* and T1*c* of the time interval T1. Of course, the definition of the weighing signal change amount may be varied according to the settings of the computing unit. For example, the weighing signal change amount ΔW1 may be defined as the sum of the differences between three weighing signals generated at three time spots T1*a*, T1*b* and T1*c* of the time interval T1, i.e. ΔW1=(W1*a*−W1*b*)+(W1*b*−W1*c*).

Alternatively, according to the settings of the computing unit, the weighing signal change amount ΔW1 may be defined as the percentage of a difference (W1*a*−W1*c*) between the two weighing signals generated at two time spots T1*a* and T1*c* of the time interval T1 relative to the initial weighing signal W0, i.e. ΔW1=(W1*a*−W1*c*)/W0×100%. Of course, the weighing signal change amount may be defined as the sum of the differences between plural weighing signals generated at plural time spots of the time interval.

An example of the stove for preventing the cooked material from being burnt dry includes but is not limited to a gas stove, an electric stove, an electromagnetic oven or a microwave oven. The weighing unit 12 is a mechanical weighing device or an electronic weighing device. Moreover, the monitoring unit 13 and the computing unit 14 may be integrated into a processing unit.

Figure 7:
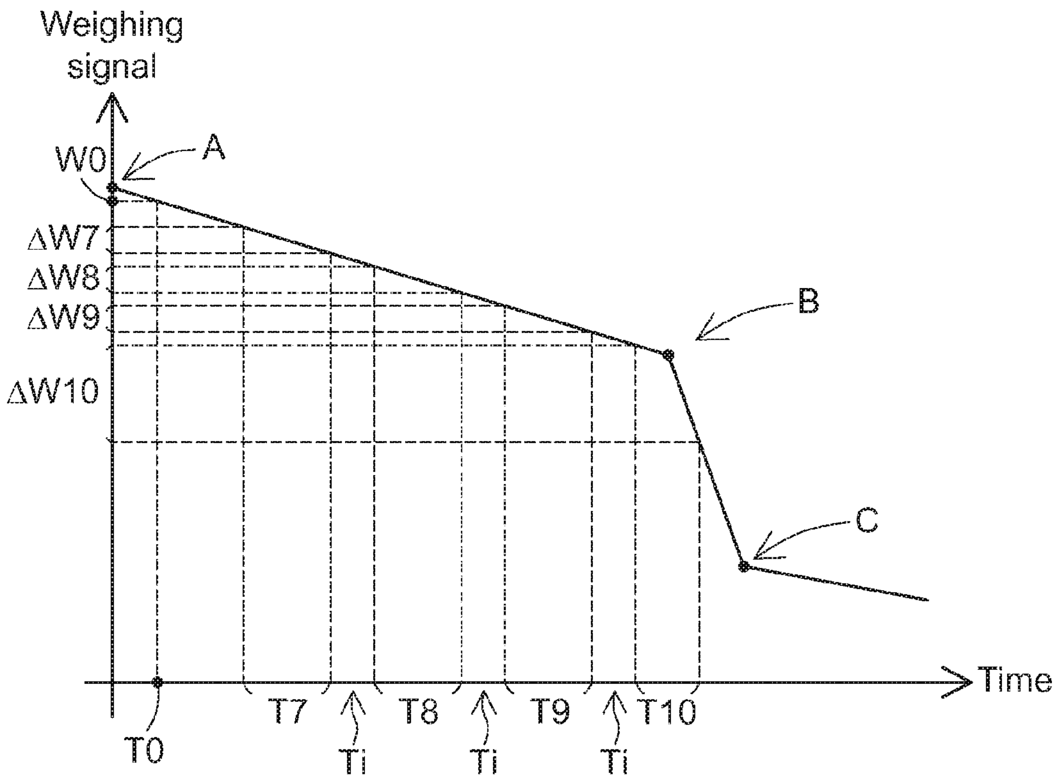
FIG. 7 schematically illustrates an approach of calculating a weight change ratio or slope of the cooked material by the computing unit according to a second embodiment of the present invention.

FIG. 7 schematically illustrates an approach of calculating a weight change ratio or slope of the cooked material by the computing unit according to a second embodiment of the present invention. For reducing the computing counts of the computing unit 14, after the weighing signal from the monitoring unit 13 is received by the computing unit 14, a plurality of weighing signal change amounts (ΔW7, ΔW8, ΔW9, ΔW10) of the cooked material within a plurality of time intervals (T7, T8, T9, T10) are successively calculated by the computing unit 14. These time intervals are discontinuous time intervals. For example, there is a time difference Ti between the specified time interval and an adjacent time interval. The time difference Ti may be adjusted according to the firepower level of the heat source. For example, if the firepower level of the heat source is relatively higher, the moisture contained in the cooked material is quickly evaporated, and thus the time difference Ti is relatively shorter. Whereas, if the firepower level of the heat source is relatively lower, the time difference Ti is relatively longer. Then, one of these weighing signal change amounts (e.g. ΔW7) is selected as a basis weighing signal change amount. After the weighing signal change amount ΔW7 is selected as the basis weighing signal change amount, the ratios of the weighing signal change amounts ΔW8, ΔW9, ΔW10 to the basis weighing signal change amount ΔW7 (i.e. ΔW8/ΔW7, ΔW9/ΔW7 and ΔW10/ΔW7) are successively calculated. Once the ratio is higher than a preset value (for example the ratio ΔW10/ΔW7 is higher than the preset value), it means that the weight of the cooked material is quickly decreased at a specified rate and the cooked material is possibly burnt dry. Meanwhile, the computing unit 14 issues a heat source adjusting signal to the heat source controlling unit 15. According to the heat source adjusting signal, the heat source controlling unit 15 will adjust the firepower level of the heat source of the stove body 11 in order to prevent the cooked material from being burnt dry.

Since these time intervals are discontinuous time intervals and there is a time difference Ti between every two adjacent time interval, the number of weighing signal change amounts is reduced. That is, the computing counts of the computing unit 14 will be reduced. Since the timing of possibly burning dry the cooked material is acquired, the possibility of burning dry the cooked material will be minimized.

Figure 8:
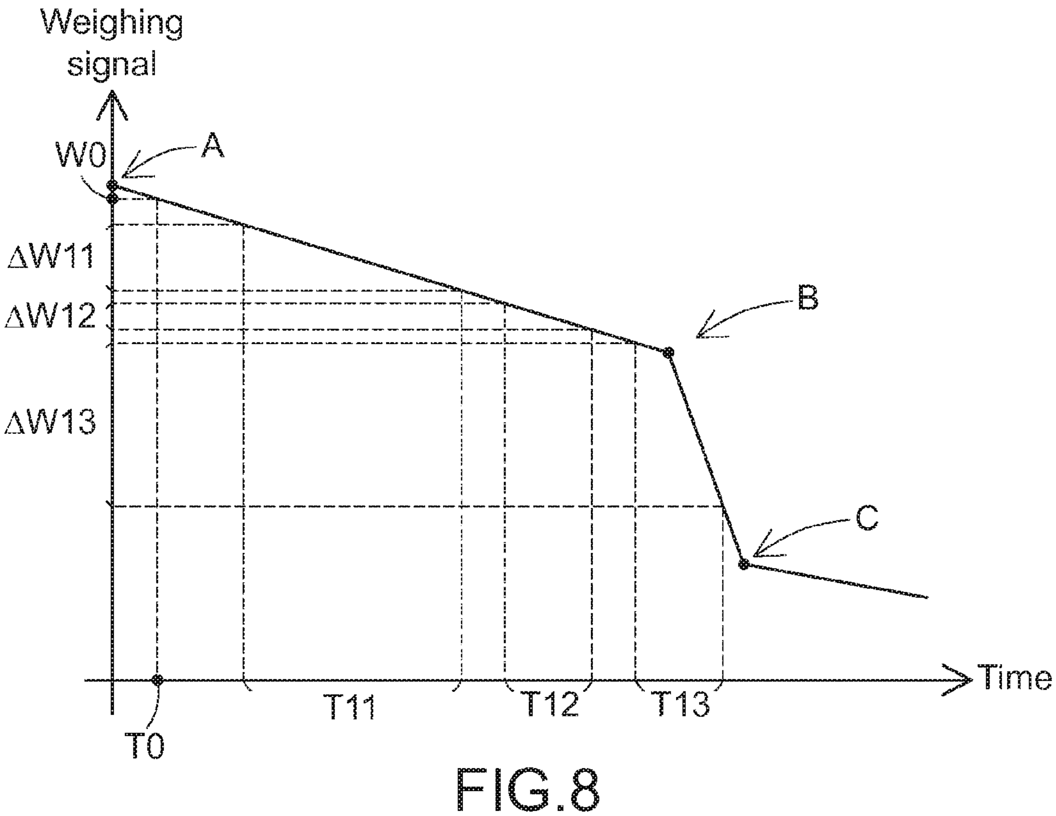
FIG. 8 schematically illustrates an approach of calculating a weight change ratio or slope of the cooked material by the computing unit according to a third embodiment of the present invention.

For solving the problem occurred in the situation that the weighing signal change amount is small in the early heating stage, the present invention further provides a third embodiment of calculating a weight change ratio or slope of the cooked material. FIG. 8 schematically illustrates an approach of calculating a weight change ratio or slope of the cooked material by the computing unit according to a third embodiment of the present invention. After the weighing signal from the monitoring unit 13 is received by the computing unit 14, a plurality of weighing signal change amounts (ΔW11, ΔW12, ΔW13) of the cooked material within a plurality of time intervals (T11, T12, T13) are successively calculated by the computing unit 14. The lengths of these time intervals T11, T12, T13 are different. Since the weighing signal change amount is small in the early heating stage, the weighing signal change amount ΔW11 corresponding to the relatively longer time interval T11 is selected as a basis weighing signal change amount. After the weighing signal change amount ΔW11 is selected as the basis weighing signal change amount, the ratios of the weighing signal change amounts ΔW12, ΔW13 to the basis weighing signal change amount ΔW11 (i.e. ΔW12/ΔW11, ΔW13/ΔW11) are successively calculated. Once the ratio is higher than a preset value (for example the ratio ΔW13/ΔW11 is higher than the preset value), the computing unit 14 issues a heat source adjusting signal to the heat source controlling unit 15. According to the heat source adjusting signal, the heat source controlling unit 15 will adjust the firepower level of the heat source of the stove body 11 in order to prevent the cooked material from being burnt dry.

Figure 9:
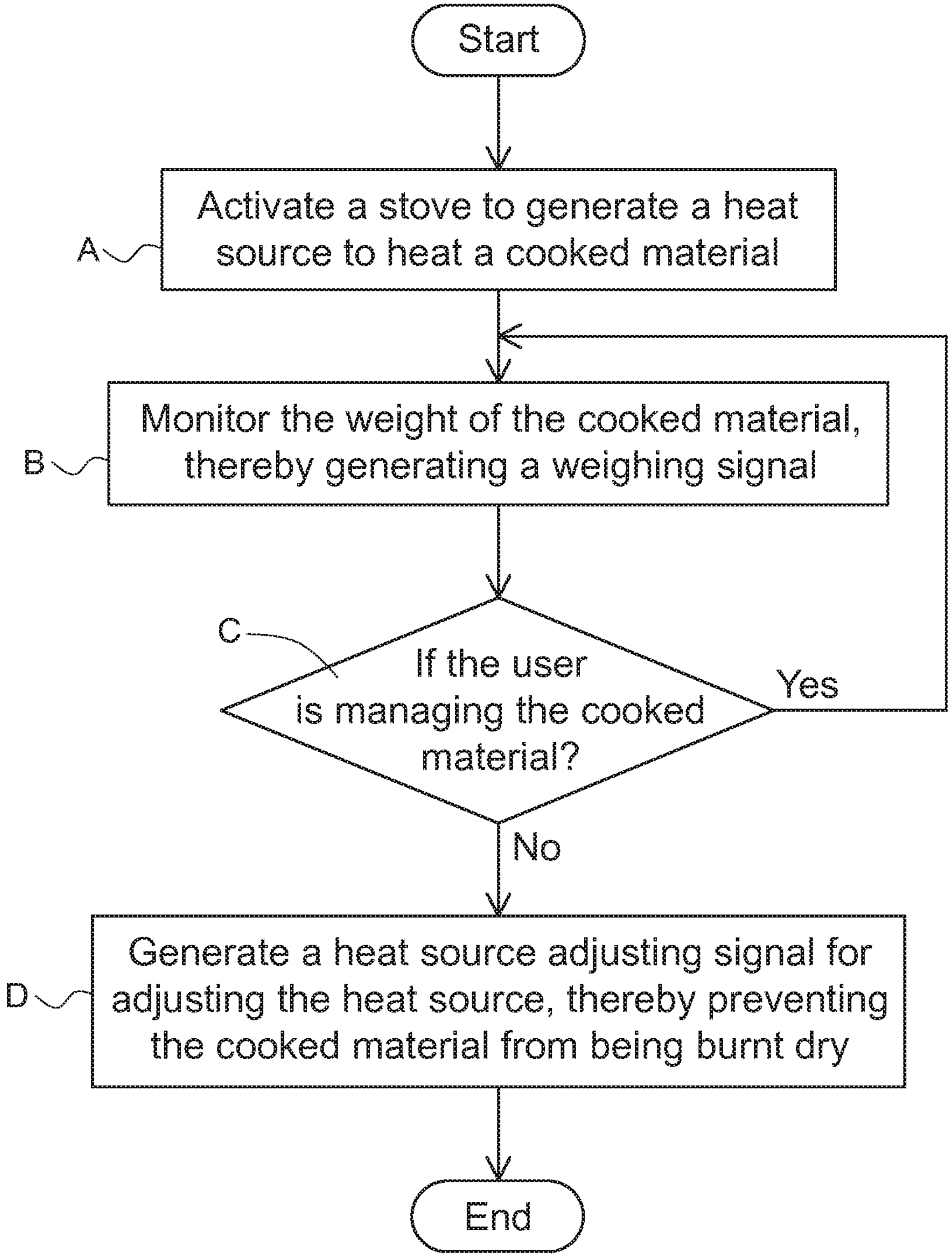
FIG. 9 is a flowchart illustrating a method for preventing the cooked material from being burnt dry in a stove.

The present invention provides a method for preventing the cooked material from being burnt dry in a stove. FIG. 9 is a flowchart illustrating a method for preventing the cooked material from being burnt dry in a stove.

Firstly, in the step A, a stove is activated to generate a heat source to heat a cooked material. Then, in the step B, the weight of the cooked material is monitored, and a weighing signal corresponding to the weight of the cooked material is generated. Then, the step C is performed to judge whether a user is located beside the stove to manage the cooked material. If the judging condition is satisfied, the step B is repeatedly done. Whereas, if the judging condition is not satisfied, the step D is performed. In the step D, a heat source adjusting signal for adjusting the heat source is generated, and the purpose of preventing the cooked material from being burnt dry is achieved according to the heat source adjusting signal. Moreover, in the step D, a plurality of weighing signal change amounts of the cooked material within a plurality of time intervals are successively obtained, and the heat source adjusting signal is generated according to these weighing signal change amounts.

Hereinafter, the method for preventing the cooked material from being burnt dry will be illustrated in more details by referring to two implementation examples.

Figure 10:
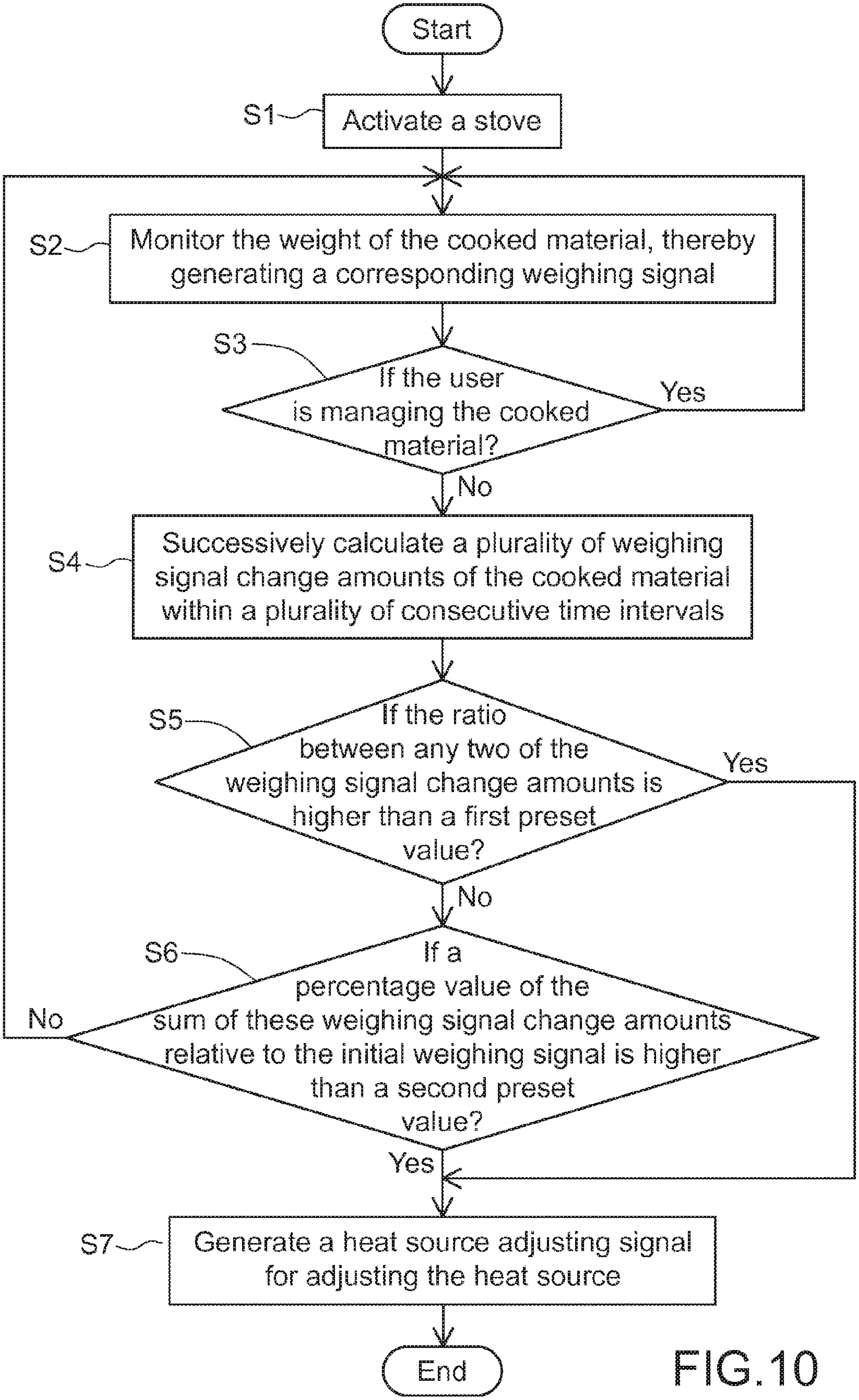
FIG. 10 is a flowchart illustrating a first exemplary method for preventing the cooked material from being burnt dry in a stove according to the present invention.

FIG. 10 is a flowchart illustrating a first exemplary method for preventing the cooked material from being burnt dry in a stove according to the present invention. Firstly, after the material to be cooked (i.e. the cooked material) is placed on the heating position of the stove, the step S1 is performed to activate the stove to generate a heat source to heat the cooked material. Then, the step S2 is performed to monitor the weight of the cooked material, thereby generating a weighing signal corresponding to the weight of the cooked material. Generally, the weight of the cooked material is gradually decreased as the heating time elapses. That is, the weighing signal is varied with the heating time. If the user deals with other matters and forgets the food is being cooked, the cooked material is possibly burnt dry to result in high risk of a fire accident. For preventing the cooked material from being burnt dry, the step S3 is performed to continuously judge whether the user is managing the cooked material during the cooking process. For example, in a case that the firepower level of the heat source is adjusted or the cooking time is set by the user, it means that the user is managing the cooked material.

According to the heating condition of the cooked material, if some other food ingredients are added to the cooked material or the thoroughly-cooked material is removed, the weight of the cooked material may be increased or decreased, or if the cooked material is stirred or turned over, the monitored weighing signal is abruptly changed. By monitoring whether the control interface of the stove is operated by the user or monitoring whether the weighing signal is abruptly changed within a monitoring time interval, the monitoring unit may judge that the user is managing the cooked material. The monitoring time interval is preset (e.g. three minutes). For example, if the weight of the cooked material is decreased by 20% within three minutes, the monitoring unit may judge that a portion of the cooked material is being removed. Whereas, if the weight of the cooked material is increased by 20% within three minutes, the monitoring unit may judge that the cooked material or other food ingredients are added. Under this circumstance, the step S2 is repeatedly done. On the other hand, if the monitoring unit judges that the cooked material is not being cooked by the user, it means that the user may deal with other matters or the user is not located beside the stove. Consequently, the anti-dry safety mechanism is enabled. Meanwhile, the weighing signal at the time spot T0 corresponds to an initial weighing signal W0. The initial weighing signal W0 is used in the subsequent computation. At the time spot T0 when the cooked material has the initial weighing signal W0, the cooked material is not managed by the user. Then, the step S4 is performed.

Figure 11:
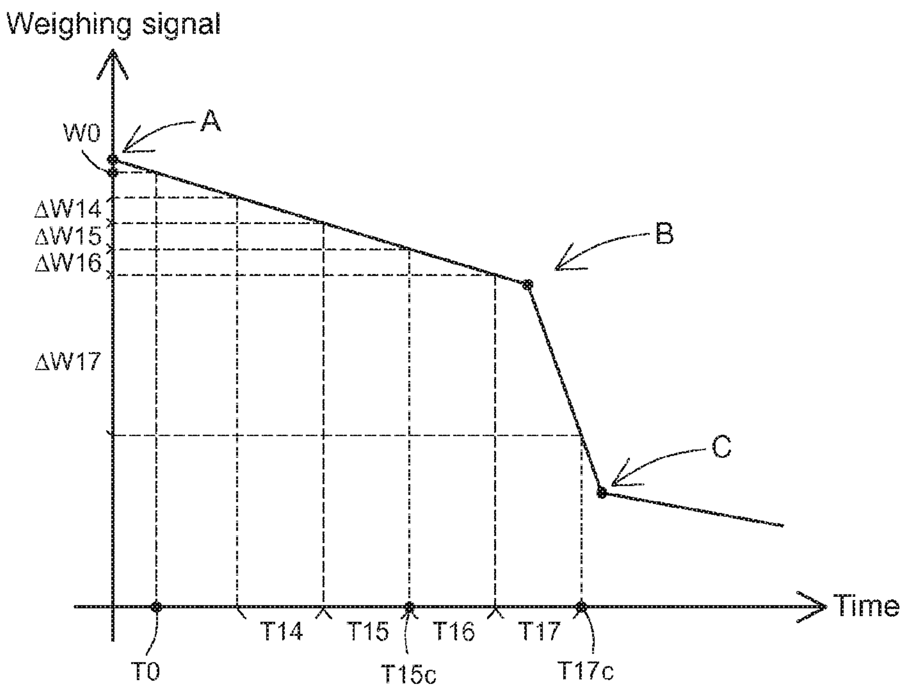
FIG. 11 schematically illustrates a first approach of calculating a weight change ratio or slope of the cooked material in the first exemplary method of FIG. 10.

FIG. 11 schematically illustrates a first approach of calculating a weight change ratio or slope of the cooked material in the first exemplary method of FIG. 10. Please refer to FIGS. 10 and 11. In the step S4, a plurality of weighing signal change amounts (ΔW14, ΔW15, ΔW16, ΔW17) of the cooked material within a plurality of consecutive time intervals (T14, T15, T16, T17) are successively calculated. Then, one of these weighing signal change amounts (e.g. ΔW14) is selected as a basis weighing signal change amount. Then, the step S5 is performed to successively calculate the ratios of the weighing signal change amounts ΔW15, ΔW16, ΔW17 to the basis weighing signal change amount ΔW14 (i.e. ΔW15/ΔW14, ΔW16/ΔW14 and ΔW17/ΔW14) and successively judge whether the ratio (i.e. ΔW15/ΔW14, ΔW16/ΔW14 or ΔW17/ΔW14) is higher than a first preset value. For example, at the time spot T17*c* when the calculated ratio ΔW17/ΔW14 is higher than the first preset value, it means that the weight of the cooked material is quickly decreased at a specified rate. In practice, the temperature of the cooked material reaches the boiling point of the liquid contained in the cooked material at this moment. Then, for preventing the cooked material from being burnt dry, the step S7 is performed to generate a heat source adjusting signal for adjusting the heat source. On the other hand, if the ratio is lower than or equal to the first preset value (for example the calculated ratio ΔW15/ΔW14 is lower than or equal to the first preset value at the time spot T15*c*), it means that the weight of the cooked material is stably decreased at a specified rate, and then the step S6 is performed.

If the monitoring unit judges that the user is managing the cooked material during the step S5 is performed, the above data should be re-acquired. Until the monitoring unit judges that the cooked material is not being managed by the user, a new initial weighing signal W0 should be acquired. Then, a plurality of weighing signal change amounts of the cooked material within a plurality of subsequent time intervals are successively calculated to determine the timing of adjusting the heat source, thereby preventing the cooked material from being burnt dry. Then the step S6 is performed.

In the following two special situations, since the ratios of the weighing signal change amounts to the basis weighing signal change amount fail to clearly judge whether the cooked material is burnt dry, the step S6 should be done. For example, in the first special situation, the cooked material is in the boiling state. That is, the cooked material is in or near the boiling state when the stove is activated. In the second special situation, the firepower level of the heat source is adjusted when the cooked material is heated to the boiling state. For example, when the cooked material is heated to the boiling state, the firepower level of the heat source is adjusted to a low level, and the cooked material is continuously cooked by the low firepower level. In a case that the above two special situations occur, the monitored weight drop rate or the slope of weight change of the cooked material is not obviously distinguished.

The step S6 is performed to calculate a percentage value of the sum of these weighing signal change amounts (ΔW14, ΔW15, ΔW16, ΔW17) relative to the initial weighing signal W0 and judge whether the percentage value is higher than a second preset value. That is, the step S6 is used for judging whether the evaporated fraction of the cooked material is excessive. If the percentage value is not higher than the second preset value, it means that no risk of burning dry the cooked material occurs, and then the step S2 is repeatedly done. For example, at the time spot T15*c* when the percentage value of the sum of the weighing signal change amounts ΔW14 and ΔW15 relative to the initial weighing signal W0 is not higher than the second preset value, the evaporated fraction of the cooked material is not over a safety limit at the time spot T15*c*. Since no risk of burning dry the cooked material occurs, the step S2 will be performed again. On the other hand, if the weighing signal change amounts ΔW14 and ΔW15 relative to the initial weighing signal W0 is higher than the second preset value at the time spot T15*c*, there is a risk of immediately burning dry the cooked material. Then, the step S7 is performed to generate a heat source adjusting signal for adjusting the heat source in order to prevent the cooked material from being burnt dry.

In response to the heat source adjusting signal, a heat source adjusting step is performed. Hereinafter, three ways of performing the heat source adjusting step to prevent the cooked material from being burnt dry will be illustrated in more details.

Figure 12:
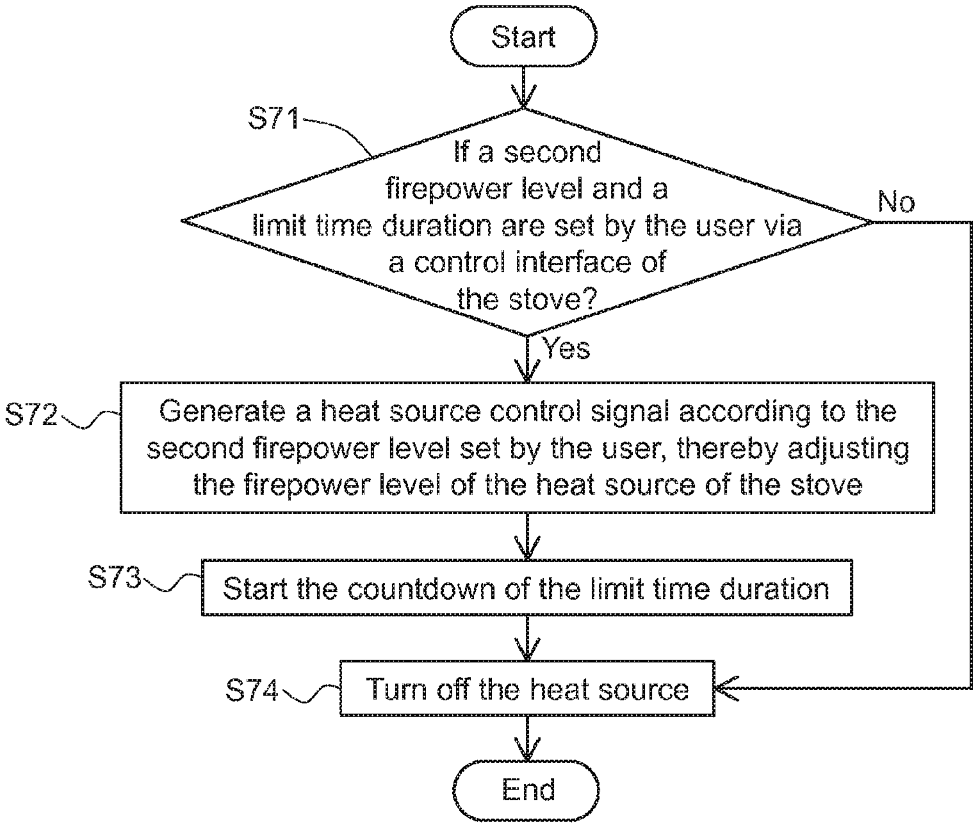
FIG. 12 schematically illustrates a first way of performing a heat source adjusting step.

FIG. 12 schematically illustrates a first way of performing a heat source adjusting step. The heat source adjusting step comprises the following sub-steps. Firstly, the sub-step S71 is performed to judge whether a second firepower level and a limit time duration are set by the user via the control interface of the stove. If the judging condition is satisfied, the sub-step S72 is performed. Whereas, if the judging condition is not satisfied, the sub-step S74 is performed. In the sub-step S72, a heat source control signal is generated according to the second firepower level set by the user, thereby adjusting the firepower level of the heat source of the stove. In the sub-step S73, the countdown of the limit time duration is started. In the sub-step S74, the heat source of the stove is turned off.

Since the user may forget the cooking material is cooked by the stove, the way of performing the heat source adjusting step should be previously determined. For example, according to the settings of the heat source via the control interface, after the cooked material is heated to the boiling point, the heat source is adjusted to a second firepower level (e.g. a low firepower level) to continuously heat the cooked material for five minutes, and then the heat source of the stove is turned off. Consequently, the purpose of preventing the cooked material from being burnt dry and the purpose of allowing the cooked material to be thoroughly cooked will be achieved. On the other hand, if the second firepower level and the limit time duration are not set by the user, when the cooked material is heated to the boiling point, the heat source of the stove may be directly turned off. Consequently, the purpose of preventing the cooked material from being burnt dry will be achieved.

Figure 13A:
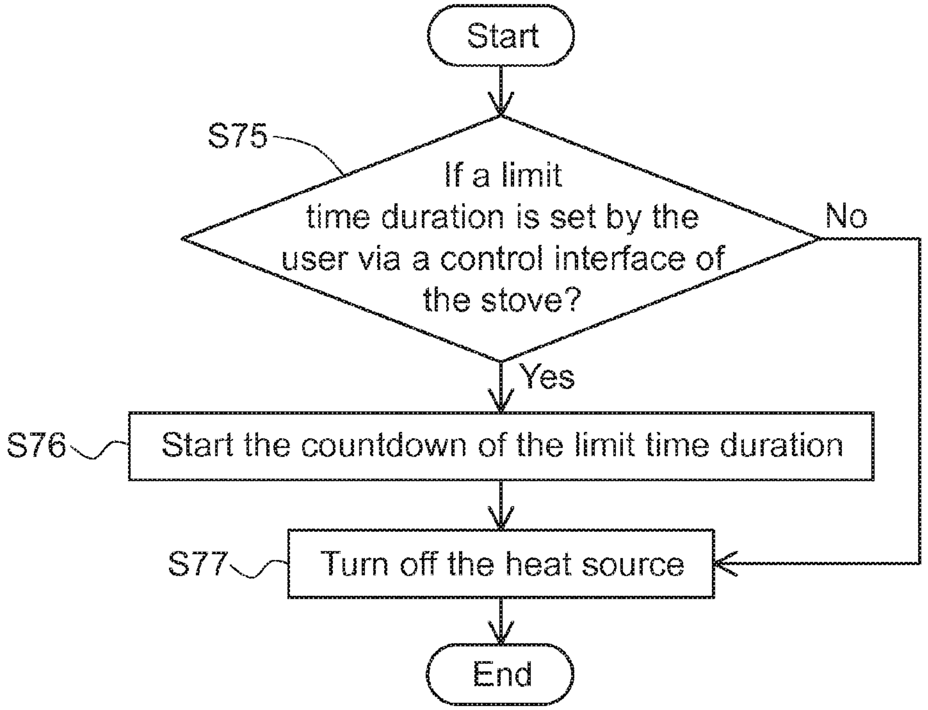
FIG. 13A schematically illustrates a second way of performing the heat source adjusting step.
Figure 13B:
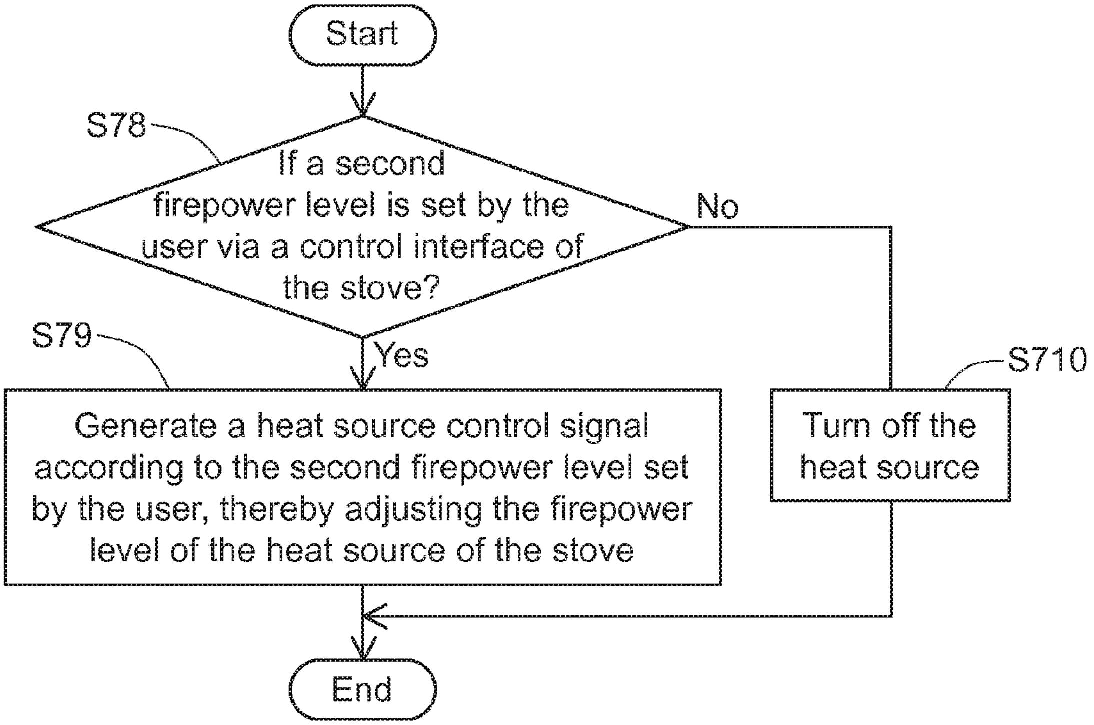
FIG. 13B schematically illustrates a third way of performing the heat source adjusting step.

In some embodiments, either the limit time duration (see FIG. 13A) or the second firepower level (see FIG. 13B) is set by the user. FIG. 13A schematically illustrates a second way of performing the heat source adjusting step. The heat source adjusting step comprises the following sub-steps. Firstly, the sub-step S75 is performed to judge whether a limit time duration is set by the user. If the judging condition is satisfied, the sub-step S76 is performed to start the countdown of the limit time duration. Whereas, if the judging condition is not satisfied, the sub-step S77 is performed to turn off the heat source of the stove, thereby preventing the cooked material from being burnt dry. FIG. 13B schematically illustrates a third way of performing the heat source adjusting step. The heat source adjusting step comprises the following sub-steps. Firstly, the sub-step S78 is performed to judge whether a second firepower level is set by the user. If the judging condition is satisfied, the sub-step S79 is performed to generate a heat source control signal generated according to the second firepower level set by the user, thereby adjusting the firepower level of the heat source of the stove. Whereas, if the judging condition is not satisfied, the sub-step S710 is performed to turn off the heat source of the stove. In this way of performing the heat source adjusting step, since the second firepower level of the heat source is able to maintain the temperature of the cooked material, the cooked material is not cooled down and the cooked material is no longer in the boiling state. Consequently, the purpose of preventing the cooked material from being burnt dry will be achieved. In such way, the anti-dry function is achieved while meeting the cooking requirements of different users.

In other words, the above three ways of performing the heat source adjusting step can achieve the purpose of preventing the cooked material from being burnt dry.

Figure 14:
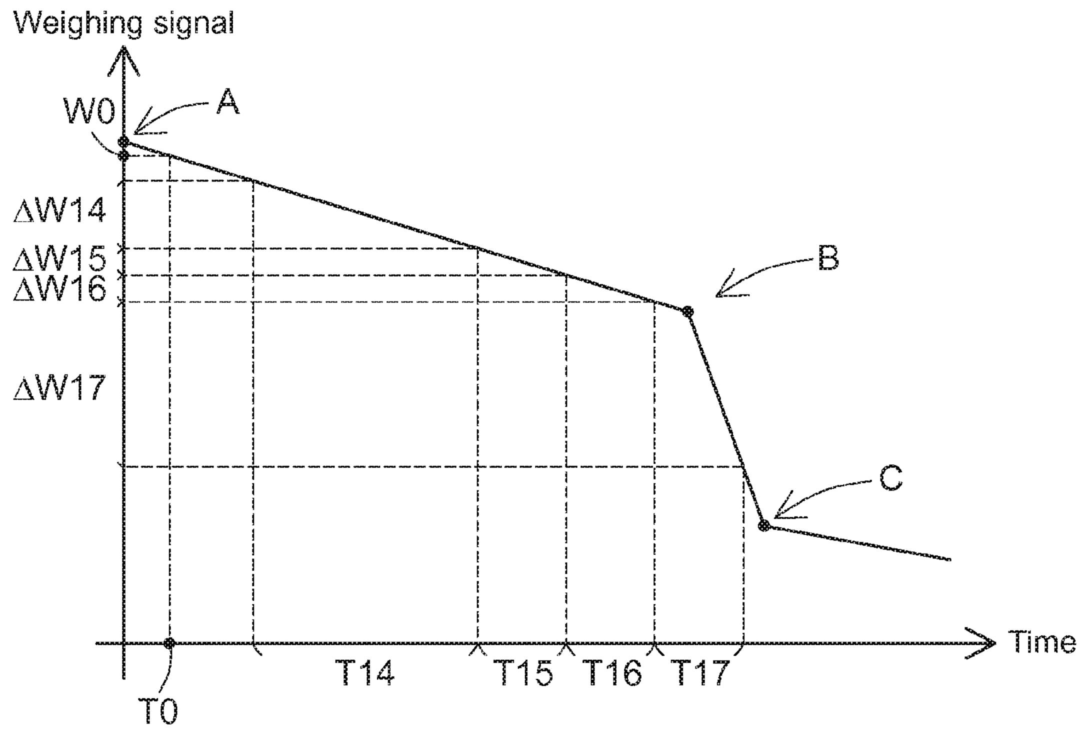
FIG. 14 schematically illustrates a second approach of calculating a weight change ratio or slope of the cooked material in the first exemplary method of FIG. 10.

FIG. 14 schematically illustrates a second approach of calculating a weight change ratio or slope of the cooked material in the first exemplary method of FIG. 10. In a case that the weighing signal change amount is small in the early heating stage, the lengths of these time intervals T14, T15, T16 and T17 are different. In addition, the weighing signal change amount ΔW14 corresponding to the relatively longer time interval T14 is selected as a basis weighing signal change amount. Since the time interval T14 is relatively longer, the weighing signal change amount is more obvious.

Figure 15:
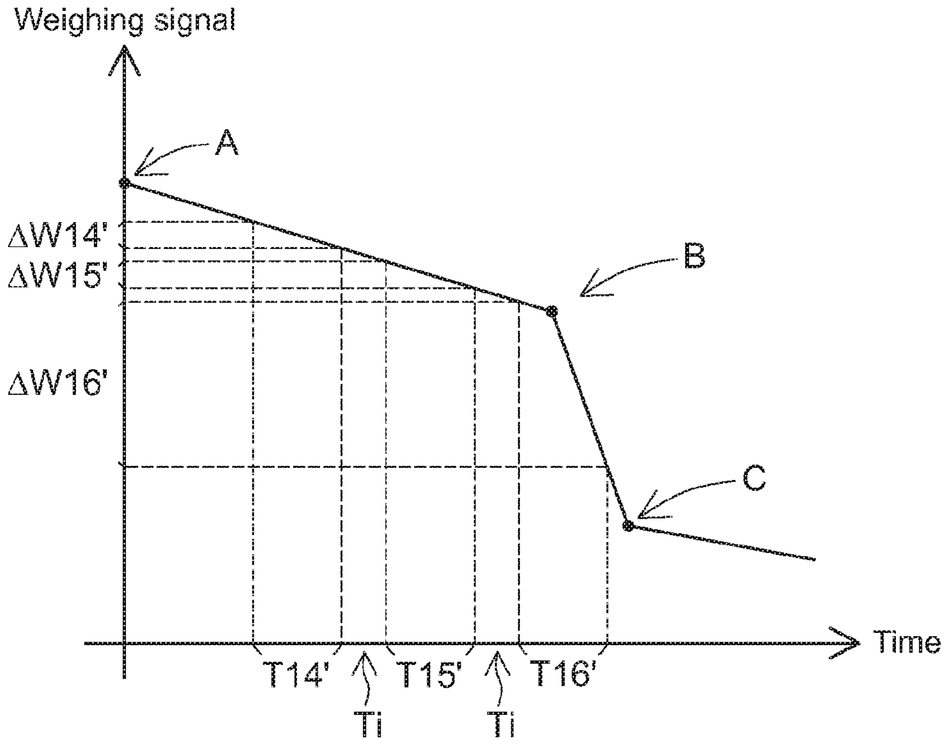
FIG. 15 schematically illustrates a third approach of calculating a weight change ratio or slope of the cooked material in the first exemplary method of FIG. 10.

FIG. 15 schematically illustrates a third approach of calculating a weight change ratio or slope of the cooked material in the first exemplary method of FIG. 10. In the first approach of calculating a weight change ratio or slope of the cooked material, the time intervals T14, T15, T16 and T17 are consecutive. Whereas, in the third approach as shown in FIG. 15, the time intervals T14', T15' and T16' are discontinuous. For example, there is a time difference Ti between every two of these time intervals T14', T15' and T16'. In addition, a plurality of weighing signal change amounts (ΔW14', ΔW15', ΔW16') of the cooked material within these time intervals T14', T15' and T16' are successively calculated. Then, the step S5 is performed to successively calculate the ratios of the weighing signal change amounts ΔW15', ΔW16' to the basis weighing signal change amount ΔW14' (i.e. ΔW15'/ΔW14', ΔW16'/ΔW14') and successively judge whether the ratio (i.e. ΔW15'/ΔW14' or ΔW16'/ΔW14') is higher than the first preset value. In the first approach of calculating a weight change ratio or slope of the cooked material, four time intervals T14, T15, T16 and T17 are needed to judge that the ratio ΔW17/ΔW14 is higher than the first preset value. Whereas, in the third approach as shown in FIG. 15, only three discontinuous time intervals T14', T15' and T16' are needed to judge that the ratio ΔW17/ΔW14 is higher than the first preset value. Since the number of calculating the ratios of the weighing signal change amounts to the basis weighing signal change amount is reduced by one, the computing counts of the hardware component will be reduced.

Figure 16:
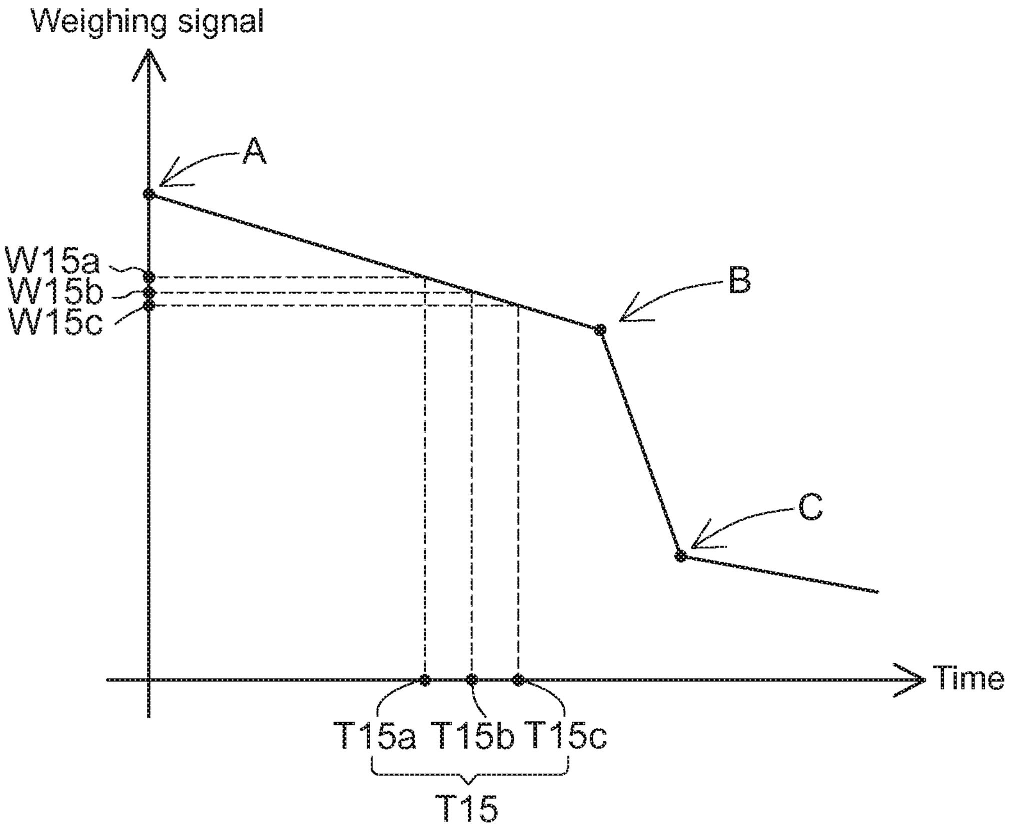
FIG. 16 schematically illustrates an approach of calculating a weighing signal change amount of the cooked material in the first exemplary method of FIG. 10.

FIG. 16 schematically illustrates an approach of calculating a weighing signal change amount of the cooked material in the first exemplary method of FIG. 10. The weighing signal change amount denotes a difference between two weighing signals generated at two time spots of the time interval. As shown in FIG. 16, the weighing signal change amount ΔW15 is the difference (W15*a*−W15*c*) between the two weighing signals generated at two time spots T15*a* and T15*c* of the time interval T15. Of course, the definition of the weighing signal change amount may be varied according to the settings of the computing unit. For example, the weighing signal change amount ΔW15 may be defined as the sum of the differences between three weighing signals generated at three time spots T15*a*, T15*b* and T15*c* of the time interval T15, i.e. ΔW15=(W15*a*−W15*b*)+(W15*b*−W15*c*). Alternatively, the weighing signal change amount ΔW15 may be defined as the percentage of a difference (W15*a*−W15*c*) between the two weighing signals generated at two time spots T15*a* and T15*c* of the time interval T15 relative to the initial weighing signal W0, i.e. ΔW1=(W15*a*−W15*c*)/W0×100%.

Figure 17:
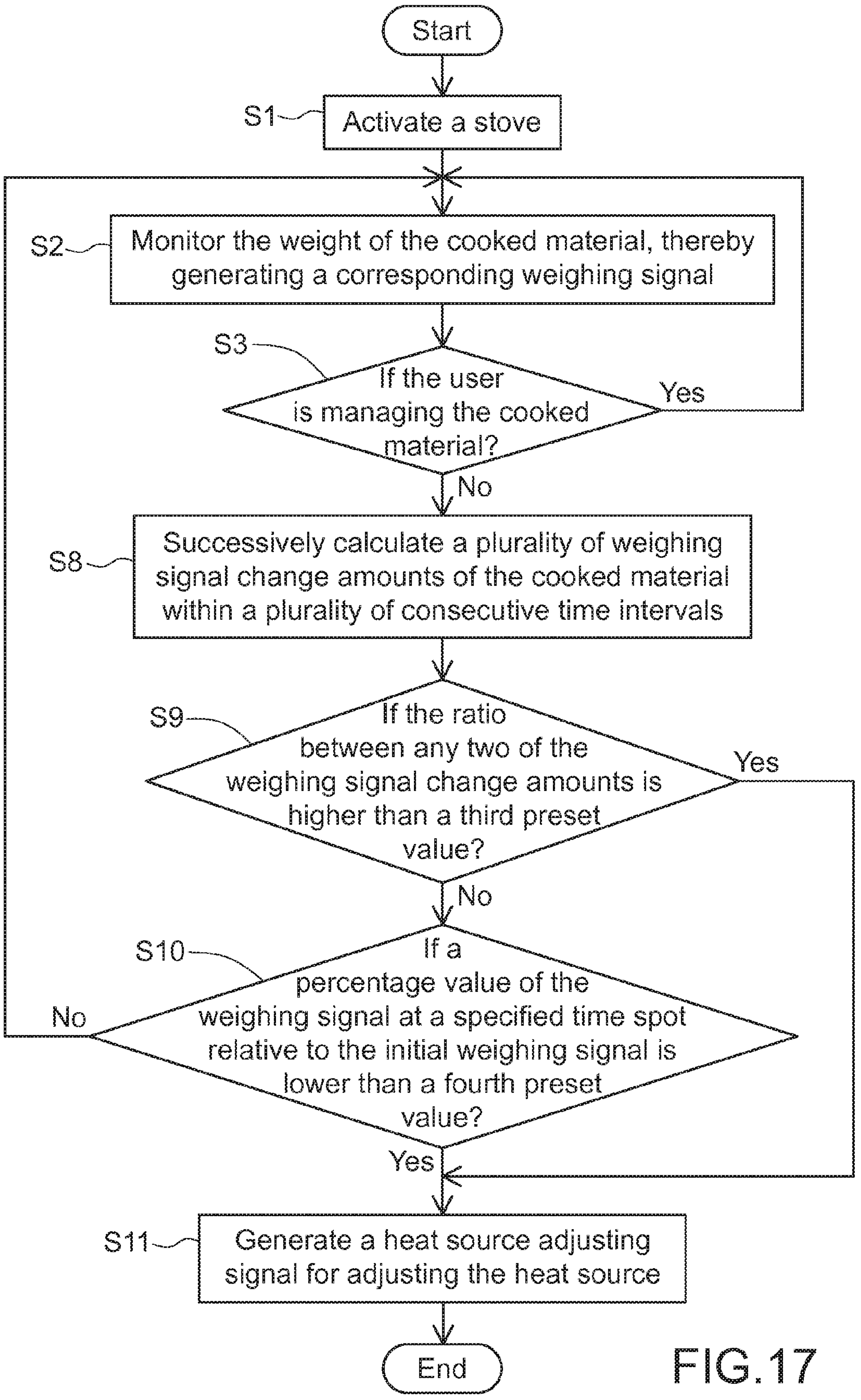
FIG. 17 is a flowchart illustrating a second exemplary method for preventing the cooked material from being burnt dry in a stove according to the present invention.

FIG. 17 is a flowchart illustrating a second exemplary method for preventing the cooked material from being burnt dry in a stove according to the present invention. The steps S1 and S2 are similar to those of the first exemplary method, and are not redundantly described herein. After the step S2 is done, the step S3 is performed to continuously judge whether the user is managing the cooked material during the cooking process. For example, in a case that the firepower level of the heat source is adjusted or the cooking time is set by the user via the control interface of the stove, it means that the user is managing the cooked material. Moreover, according to the heating condition of the cooked material, if some other food ingredients are added to the cooked material or the thoroughly-cooked material is removed or if the cooked material is stirred or turned over, the monitored weighing signal corresponding to the cooked material may be increased or decreased. By monitoring whether the control interface of the stove is operated by the user or monitoring whether the weighing signal is abruptly changed within a monitoring time interval, the monitoring unit may judge that the user is managing the cooked material. If the monitoring unit judges that the user is managing the cooked material, the step S2 is repeatedly done. On the other hand, if the monitoring unit judges that the cooked material is not being cooked by the user, it means that the user may deal with other matters or the user is not located beside the stove. Consequently, the anti-dry safety mechanism is enabled. Meanwhile, the weighing signal at the time spot T0 corresponds to an initial weighing signal W0. The initial weighing signal W0 is used in the subsequent computation. Then, the step S8 is performed.

Figure 18:
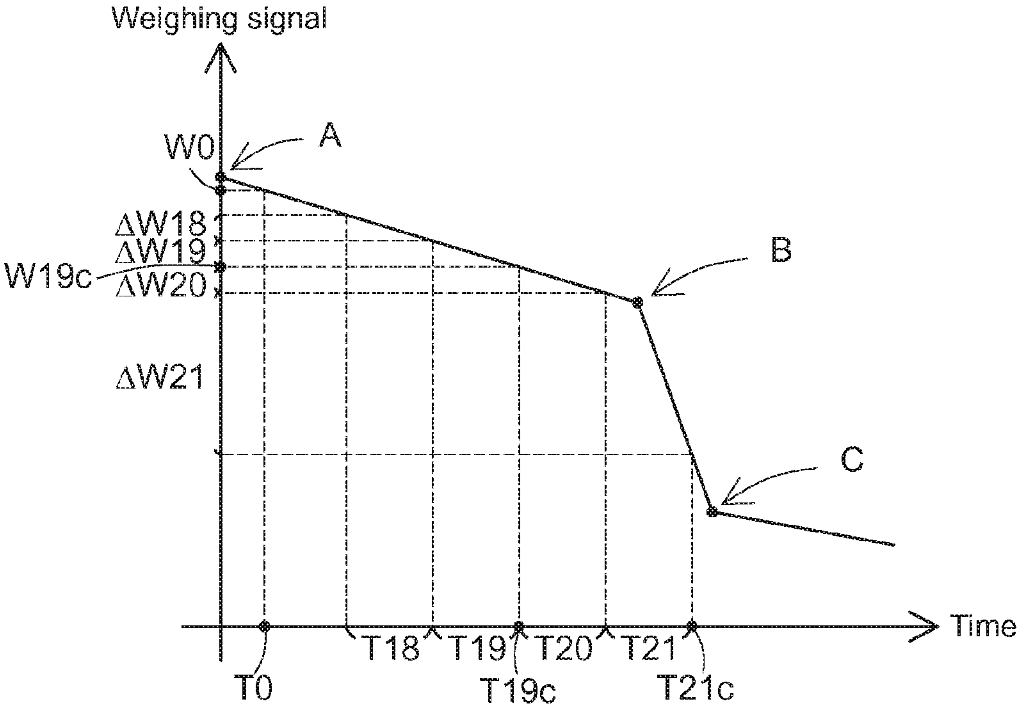
FIG. 18 schematically illustrates a first approach of calculating a weight change ratio or slope of the cooked material in the second exemplary method of FIG. 17.

FIG. 18 schematically illustrates a first approach of calculating a weight change ratio or slope of the cooked material in the second exemplary method of FIG. 17. In the step S8, a plurality of weighing signal change amounts (ΔW18, ΔW19, ΔW20, ΔW21) of the cooked material within a plurality of consecutive time intervals (T18, T19, T20, T21) are successively calculated. Then, one of these weighing signal change amounts (e.g. ΔW18) is selected as a basis weighing signal change amount. Then, the step S9 is performed to successively calculate the ratios of the weighing signal change amounts ΔW19, ΔW20, ΔW21 to the basis weighing signal change amount ΔW18 (i.e. ΔW19/ΔW18, ΔW20/ΔW18 and ΔW21/ΔW18) and successively judge whether the ratio (i.e. ΔW20/ΔW18 or ΔW21/ΔW18) is higher than a second preset value. For example, at the time spot T21*c* when the calculated ratio ΔW21/ΔW18 is higher than the third preset value, it means that the weight of the cooked material is quickly decreased at a specified rate. In practice, the temperature of the cooked material reaches the boiling point of the liquid contained in the cooked material at this moment. Then, for preventing the cooked material from being burnt dry, the step S11 is performed to generate a heat source adjusting signal for adjusting the heat source. On the other hand, if the ratio is lower than or equal to the third preset value (for example the calculated ratio ΔW19/ΔW18 is lower than the third preset value at the time spot T19*c*), it means that the weight of the cooked material is stably decreased at a specified rate, and then the step S10 is performed.

In the following two special situations, since the ratios of the weighing signal change amounts to the basis weighing signal change amount fail to clearly judge whether the cooked material is burnt dry, the step S10 should be done. For example, in the first special situation, the cooked material is in the boiling state. That is, the cooked material is in or near the boiling state when the stove is activated. In the second special situation, the firepower level of the heat source is adjusted when the cooked material is heated to the boiling state. For example, when the cooked material is heated to the boiling state, the firepower level of the heat source is adjusted to a low level, and the cooked material is continuously cooked by the low firepower level. In a case that the above two special situations occur, the monitored weight drop rate or the slope of weight change of the cooked material is not obviously distinguished.

The step S10 is performed to calculate a percentage value of the weighing signal at a specified time spot relative to the initial weighing signal W0 and judge whether the percentage value is lower than a fourth preset value. For example, at the time spot T19*c*, the percentage value of the weighing signal change amount W19*c* relative to the initial weighing signal W0 is calculated. If the percentage value is lower than the fourth preset value, it means that the fraction of the remaining cooked material (i.e. the evaporated fraction of the cooked material is excluded) is too low. In this embodiment, if the percentage value is not lower than the fourth preset value, it means that the cooked material can be continuously heated, and then the step S2 is repeatedly done. Whereas, if the percentage value is lower than the fourth preset value, the above two situations possibly occur and the cooked material is possibly burnt dry. Then, the step S11 is performed to generate a heat source adjusting signal for adjusting the heat source in order to prevent the cooked material from being burnt dry. In response to the heat source adjusting signal, a heat source adjusting step is performed. Hereinafter, the ways of performing the heat source adjusting step are similar to those illustrated in the first exemplary method (see FIGS. 12, 13A and 13B), and are not redundantly described herein.

Figure 19:
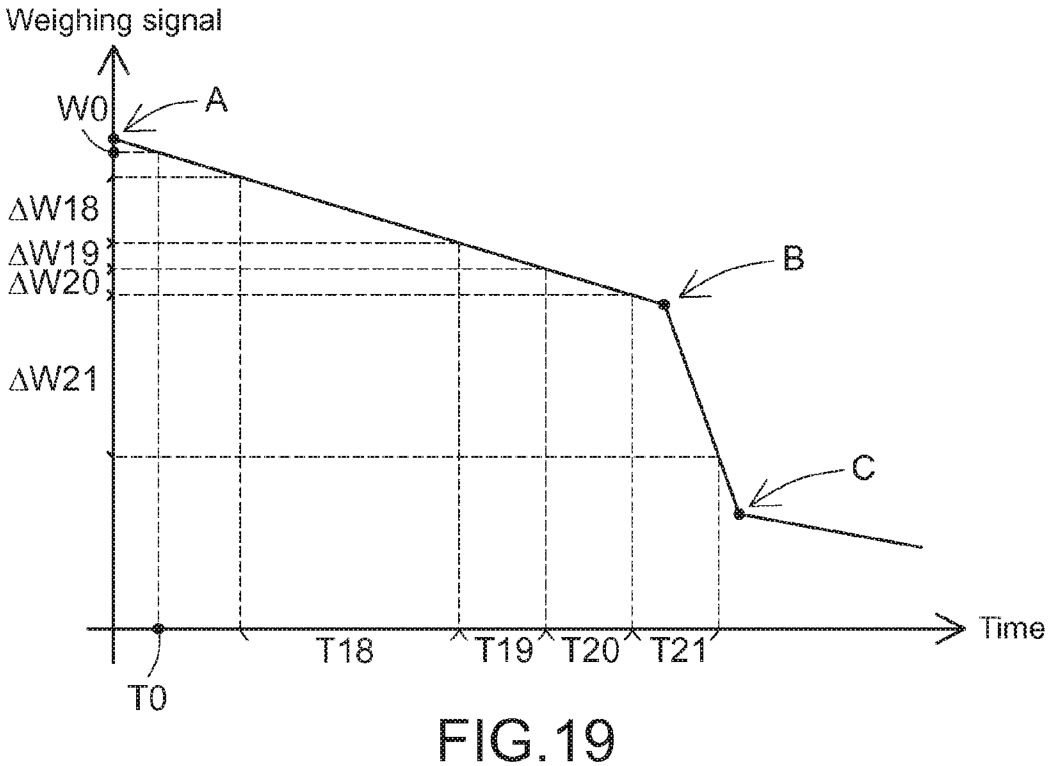
FIG. 19 schematically illustrates a second approach of calculating a weight change ratio or slope of the cooked material in the second exemplary method of FIG. 17.

FIG. 19 schematically illustrates a second approach of calculating a weight change ratio or slope of the cooked material in the second exemplary method of FIG. 17. In a case that the weighing signal change amount is small in the early heating stage, the lengths of these time intervals T18, T19, T20 and T21 are different. In addition, the weighing signal change amount ΔW18 corresponding to the relatively longer time interval T18 is selected as a basis weighing signal change amount. Since the time interval T18 is relatively longer, the weighing signal change amount is more obvious.

Figure 20:
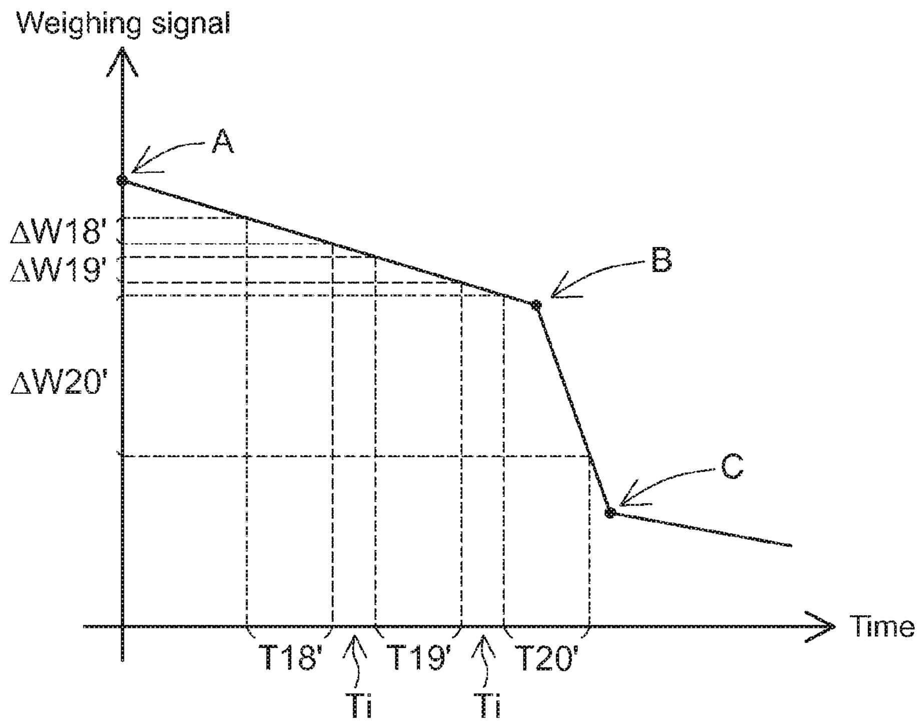
FIG. 20 schematically illustrates a third approach of calculating a weight change ratio or slope of the cooked material in the second exemplary method of FIG. 17.

FIG. 20 schematically illustrates a third approach of calculating a weight change ratio or slope of the cooked material in the second exemplary method of FIG. 17. In the first approach of calculating a weight change ratio or slope of the cooked material, the time intervals T18, T19, T20 and T21 are consecutive. Whereas, in the third approach as shown in FIG. 20, the time intervals T18', T19' and T20' are discontinuous. For example, there is a time difference Ti between every two of these time intervals T18', T19' and T20'. In addition, a plurality of weighing signal change amounts (ΔW18', ΔW19', ΔW20') of the cooked material within these time intervals T18', T19' and T20' are successively calculated. Then, the step S9 is performed to successively calculate the ratios of the weighing signal change amounts ΔW19', ΔW20' to the basis weighing signal change amount ΔW18' (i.e. ΔW19'/ΔW18', ΔW20'/ΔW18') and successively judge whether the ratio (i.e. ΔW19'/ΔW18' or ΔW20'/ΔW18') is higher than the third preset value. In the second approach of calculating a weight change ratio or slope of the cooked material, four time intervals T18, T19, T20 and T21 are needed to judge that the ratio ΔW21/ΔW18 is higher than the third preset value. Whereas, in the third approach as shown in FIG. 20, only three discontinuous time intervals T18', T19' and T20' are needed to judge that the ratio ΔW20'/ΔW18' is higher than the third preset value. Since the number of calculating the ratios of the weighing signal change amounts to the basis weighing signal change amount is reduced by one, the loading of the hardware component will be reduced.

Figure 21:
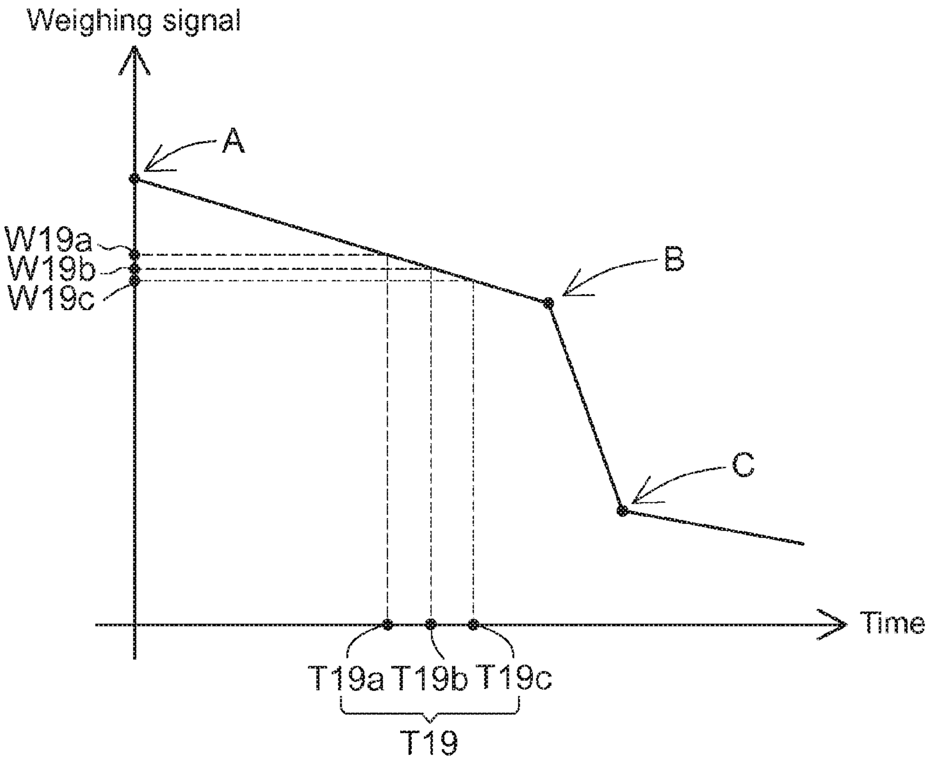
FIG. 21 schematically illustrates an approach of calculating a weighing signal change amount of the cooked material in the second exemplary method of FIG. 17.

FIG. 21 schematically illustrates an approach of calculating a weighing signal change amount of the cooked material in the second exemplary method of FIG. 17. The weighing signal change amount denotes a difference between two weighing signals generated at two time spots of the time interval. As shown in FIG. 21, the weighing signal change amount ΔW19 is the difference (W19*a*–W19*c*) between the two weighing signals generated at two time spots T19*a* and T19*c* of the time interval T19. Of course, the definition of the weighing signal change amount may be varied according to the settings of the computing unit. For example, the weighing signal change amount ΔW19 may be defined as the sum of the differences between three weighing signals generated at three time spots T19*a*, T19*b* and T19*c* of the time interval T19, i.e. ΔW19=(W19*a*–W19*b*)+(W19*b*–W19*c*). Alternatively, the weighing signal change amount ΔW19 may be defined as the percentage of a difference (W19*a*–W19*c*) between the two weighing signals generated at two time spots T19*a* and T19*c* of the time interval T19 relative to the initial weighing signal W0, i.e. ΔW1=(W19*a*–W19*c*)/W0×100%.

In the first exemplary method and the second exemplary method of the present invention, two different approaches are used for calculating the weight change ratio or slope of the cooked material in the situation that the monitored weight drop rate or the slope of weight change of the cooked material is not obviously distinguished. Consequently, the purpose of preventing the cooked material from being burnt dry is achieved.

From the above description, the anti-dry method of the present invention can prevent the continuous heating condition from burning dry the cooked material by monitoring the weight drop rate or the slope of weight change of the cooked material and monitoring whether the user is managing the cooked material.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for preventing a cooked material from being burnt dry in a stove, said method comprising steps of:

(A) activating said stove to generate a heat source to heat said cooked material;

(B) sensing a weight of said cooked material, thereby generating a weighing signal correspondingly;

(C) judging whether said cooked material is being managed by a user, wherein if said cooked material is being managed by said user, said step (B) is performed, wherein if said cooked material is not being managed by said user, said step (D) is performed; and (D) generating a heat source adjusting signal for adjusting said heat source, thereby preventing said cooked material from being burnt dry, wherein in said step (D), a plurality of weighing signal change amounts are respectively generated within a plurality of time intervals, and said heat source adjusting signal is generated according to said weighing signal change amounts.

2. The method according to claim 1 wherein said step (C) is performed to monitor whether said weighing signal is abruptly changed within a monitoring time interval, thereby judging whether said cooked material is being managed by said user, or said step (C) is performed to monitor whether a control interface of said stove is operated.

3. The method according to claim 1 wherein said step (D) further comprises sub-steps:

(D1) successively generating said weighing signal change amounts within said time intervals;

(D2) calculating a ratio between any two of said weighing signal change amounts, and judging whether said ratio is higher than a first preset value, wherein if said ratio is higher than said first preset value, a sub-step (D4) is performed, wherein if said ratio is not higher than said first preset value, a sub-step (D3) is performed;

(D3) calculating a percentage value of a sum of said weighing signal change amounts relative to an initial weighing signal, and judging whether said percentage value is higher than a second preset value, wherein if said percentage value is higher than said second preset value, said sub-step (D4) is performed, wherein if said percentage value is not higher than said second preset value, said step (B) is performed; and (D4) generating said heat source adjusting signal.

4. The method according to claim 3 wherein each of said weighing signal change amounts denotes a weighing signal difference between two weighing signals generated at two time spots of a corresponding time interval, or each of said weighing signal change amounts denotes a percentage value of said weighing signal difference relative to said initial weighing signal.

5. The method according to claim 3 wherein in said sub-step (D4), a heat source adjusting step is enabled in response to said heat source adjusting signal.

6. The method according to claim 5 wherein said heat source adjusting step comprises sub-steps:

(D41) judging whether a second firepower level and a limit time duration are set by said user, wherein if said second firepower level and said limit time duration are set by said user, a sub-step (D42) is performed, wherein if said second firepower level and said limit time duration are not set by said user, a sub-step (D44) is performed;

(D42) generating a heat source control signal according to said second firepower level set by the user, thereby adjusting said heat source;

(D43) starting countdown of said limit time duration; and (D44) turning off said heat source of said stove.

7. The method according to claim 5 wherein said heat source adjusting step comprises sub-steps:

(D45) judging whether a limit time duration is set by said user, wherein if said limit time duration is set by said user, a sub-step (D46) is performed, wherein if said limit time duration is not set by said user, a sub-step (D47) is performed;

(D46) starting countdown of said limit time duration; and (D47) turning off said heat source of said stove.

8. The method according to claim 5 wherein said heat source adjusting step comprises sub-steps:

(D48) judging whether a second firepower level is set by said user, wherein if said second firepower level is set by said user, a sub-step (D49) is performed, wherein if said second firepower level is not set by said user, said heat source of said stove is turned off; and (D49) generating a heat source control signal according to said second firepower level set by the user, thereby adjusting said heat source.

9. The method according to claim 1 wherein said step (D) further comprises sub-steps:

(D5) successively generating said weighing signal change amounts within said time intervals;

(D6) calculating a ratio between any two of said weighing signal change amounts, and judging whether said ratio is higher than a first preset value, wherein if said ratio is higher than said first preset value, a sub-step (D8) is performed, wherein if said ratio is not higher than said first preset value, a sub-step (D7) is performed;

(D7) calculating a percentage value of said weighing signal at a specified time spot of said time intervals relative to an initial weighing signal, and judging whether said percentage value is lower than a second preset value, wherein if said percentage value is lower than said second preset value, said sub-step (D8) is performed, wherein if said percentage value is not lower than said second preset value, said step (B) is performed; and (D8) generating said heat source adjusting signal.

10. The method according to claim 9 wherein each of said weighing signal change amounts denotes a weighing signal difference between two weighing signals generated at two time spots of a corresponding time interval, or each of said weighing signal change amounts denotes a percentage value of said weighing signal difference relative to said initial weighing signal.

11. The method according to claim 9 wherein in said step (D8), a heat source adjusting step is enabled in response to said heat source adjusting signal.

12. The method according to claim 11 wherein said heat source adjusting step comprises sub-steps:

(D81) judging whether a second firepower level and a limit time duration are set by said user, wherein if said second firepower level and said limit time duration are set by said user, a sub-step (D82) is performed, wherein if said second firepower level and said limit time duration are not set by said user, a sub-step (D84) is performed;

(D82) generating a heat source control signal according to said second firepower level set by the user, thereby adjusting said heat source;

(D83) starting countdown of said limit time duration; and (D84) turning off said heat source of said stove.

13. The method according to claim 11 wherein said heat source adjusting step comprises sub-steps:

(D85) judging whether a limit time duration is set by said user, wherein if said limit time duration is set by said user, a sub-step (D86) is performed, wherein if said limit time duration is not set by said user, a sub-step (D87) is performed;

(D86) starting countdown of said limit time duration; and (D87) turning off said heat source of said stove.

14. The method according to claim 11 wherein said heat source adjusting step comprises sub-steps:

(D88) judging whether a second firepower level is set by said user, wherein if said second firepower level is set by said user, a sub-step (D89) is performed, wherein if said second firepower level is not set by said user, said heat source of said stove is turned off; and (D89) generating a heat source control signal according to said second firepower level set by the user, thereby adjusting said heat source.

* * * * *

UNITED STATES PATENT AND TRADEMARK OFFICE

CERTIFICATE OF CORRECTION

PATENT NO. : 8,574,649 B2
APPLICATION NO. : 13/242901
DATED : November 5, 2013
INVENTOR(S) : Yu-Chieh Lin It is certified that error appears in the above-identified patent and that said Letters Patent is hereby corrected as shown below:

Title Page, item [76] inventor: should read as following, --Yu-Chieh Lin--

Signed and Sealed this
Eighteenth Day of February, 2014

Michelle K. Lee

Michelle K. Lee
*Deputy Director of the United States Patent and Trademark Office*